United States Patent [19]
Murata

[11] Patent Number: 5,213,186
[45] Date of Patent: May 25, 1993

[54] CONTROL SYSTEM AND METHOD FOR AUTOMATIC TRANSMISSION

[75] Inventor: Kiyohito Murata, Susono, Japan

[73] Assignee: Toyota Jidosha Kabushiki Kaisha, Toyota, Japan

[21] Appl. No.: 802,006

[22] Filed: Nov. 27, 1991

[30] Foreign Application Priority Data

| Nov. 30, 1990 | [JP] | Japan | 2-333645 |
| Dec. 10, 1990 | [JP] | Japan | 2-409754 |
| Dec. 10, 1990 | [JP] | Japan | 2-409755 |

[51] Int. Cl.$^5$ ............................................. F16D 47/06
[52] U.S. Cl. .............................. 192/0.052; 192/0.076; 192/0.096; 192/3.33
[58] Field of Search ............ 192/0.052, 0.075, 0.076, 192/0.092, 0.094, 0.096, 0.098, 3.25, 3.3, 3.33

[56] References Cited

U.S. PATENT DOCUMENTS

| 2,828,244 | 6/1958 | Oldberg | 236/35 |
| 4,423,803 | 1/1984 | Malloy | 192/3.29 |
| 4,473,145 | 9/1984 | Bopp | 192/3.29 |
| 4,493,406 | 1/1985 | Bopp | 192/58 B |
| 4,496,034 | 1/1985 | Bopp | 192/3.28 |
| 4,505,365 | 3/1985 | Bopp | 192/3.29 |
| 4,540,076 | 9/1985 | Bopp | 192/58 B |
| 4,557,357 | 12/1985 | Tinholt | 192/3.21 |
| 4,580,671 | 4/1986 | Matsuoka et al. | 192/3.33 X |
| 4,589,537 | 5/1986 | Nishikawa et al. | 192/0.052 |
| 4,643,283 | 2/1987 | Wonn | 192/3.33 |
| 4,718,525 | 1/1988 | Yamaguchi | 192/0.052 |
| 4,828,082 | 5/1988 | Brand et al. | 192/3.3 |
| 5,035,308 | 7/1991 | Baba et al. | 192/0.052 |
| 5,044,477 | 9/1991 | Bojas et al. | 192/3.33 X |
| 5,060,769 | 10/1991 | Yoshimura et al. | 192/0.052 X |
| 5,086,894 | 2/1992 | Tizuka et al. | 192/3.33 X |
| 5,090,527 | 2/1992 | Imamura et al. | 192/3.33 X |

FOREIGN PATENT DOCUMENTS

| 0373219 | 5/1988 | European Pat. Off. |
| 57-157859 | 9/1982 | Japan |
| 58-34262 | 2/1983 | Japan |
| 61-157746 | 9/1986 | Japan |
| 61-252964 | 11/1986 | Japan |
| 62-45459 | 3/1987 | Japan |
| 1-150066 | 6/1989 | Japan |

OTHER PUBLICATIONS

SAE Technical Paper Series, Modeling Torque Converter Clutch Viscous Damper Performance, Simon C. Y. Tung and James L. Linden, International Congress & Exposition, Detroit, Mich., Feb. 25–Mar. 1, 1985.

Primary Examiner—Rodney H. Bonck
Assistant Examiner—Andrea Pitts
Attorney, Agent, or Firm—Kenyon & Kenyon

[57] ABSTRACT

A control system for use in an automatic transmission which is connected to an engine comprises: a fluid coupling for transmitting a torque between an input member and an output member; a lock-up clutch adapted to be selectively engaged with and released from the input member; and a variable capacity type viscous coupling arranged in series between the lock-up clutch and the output member. The control system comprises: a lock-up detector for detecting that the lock-up clutch is engaged; an output state detector for detecting an output state of the engine; a torque transmission capacity determiner for determining a torque transmission capacity of the variable capacity type viscous coupling in accordance with the output state of the engine which is detected by the output state detector, if the lock-up detecting means detects that the lock-up clutch is engaged; and a mechanism for setting the torque transmission capacity of the variable capacity type viscous coupling to said determined torque transmission capacity.

23 Claims, 23 Drawing Sheets

CONTROL SYSTEM AND METHOD FOR AUTOMATIC TRANSMISSION

BACKGROUND OF THE INVENTION

The present invention relates to a technology for controlling an automatic transmission including a fluid coupling such as a torque converter and, more particularly, to a technology for controlling a variable capacity type viscous coupling arranged in parallel relationship with the fluid coupling.

The characteristics of a vehicle provided with an automatic transmission such as the starting/running performances or the fuel economy are highly influenced by the characteristics not only of an engine but also of the automatic transmission, as is well known in the art.

For example, FIG. 26 is a diagram plotting the engine characteristics in terms of the relation between the rotational speed and the torque. A low speed type engine (E/G) has a higher torque at a lower speed side than 4,000 to 5,000 r.p.m., but a high speed type engine (E/G) has a higher torque at a higher speed.

On the other hand, FIGS. 27 to 30 are diagrams plotting the general characteristics of the torque converter. As could be seen especially from FIGS. 27, 28 and 29, the lower capacity type torque converter has the higher torque ratio at a lower speed ratio e at a start or acceleration so that it can produce the higher output torque with respect to an input torque.

If, therefore, a low capacity type torque converter is connected to a high speed type engine, the so-called "power run" can be achieved while the rotational speed of the engine is held at a reasonably high level by depressing the accelerator pedal. As could also be seen from FIG. 30, the low capacity type torque converter can utilize the maximum range of the engine torque so that starting acceleration is further improved.

In order to improve the mileage of the vehicle, on the other hand, it is preferable to use a highly efficient torque converter and accordingly a high capacity type torque converter. As could be seen from FIGS. 27, 28 or 29, the higher capacity type torque converter exhibits higher values in torque transmission efficiency when the speed ratio and the input rotational speed are at a somewhat high level. In an ordinary run with exception of a starting or extreme acceleration, the speed ratio is approximately at "1", and the engine rotational speed is about 2,000 to 4,000 r.p.m. so that the higher capacity type torque converter can create a more efficient run.

Here, what is required for the vehicle is preferably to satisfy neither the starting/accelerating performances nor the mileage in the aforementioned contrary relationship but to satisfy both of them simultaneously. Since, however, the characteristics of the torque converter are determined by capacity factors such as the external diameter of a pump impeller or turbine-runner, the structure of a blade or the structure of a stator, it is difficult for the existing torque converter to satisfy those contradictory characteristics.

In the prior art, therefore, a variable capacity type torque converter capable of varying the torque transmission capacity has been proposed in Japanese Patent Laid-Open No. 150066/1989.

This torque converter is enabled to change its performance curve by dividing a stator into a plurality of parts, by connecting the individual stator parts to a predetermined stationary portion by clutches, and by controlling the clutches. As a result, the torque transmission capacity can be stepwise varied in accordance with the degree of throttle opening.

In the torque converter disclosed in the aforementioned Laid-Open, however, the torque transmission capacity is varied by suitably releasing a clutch which holds any of the divided stators to eliminate a reaction of that stator. As a result, the torque transmission capacity to be set is restricted to the number of divided stators so that it cannot effectively function for all the various running modes. Moreover, it frequently occurs that the optimum point of the engine torque cannot be used.

If, on the other hand, the number of divisions of the stator is increased to eliminate such disadvantages, it is accordingly necessary to increase the number of one-way clutches for holding the stator parts directly and the number of clutches for controlling the engagement/release. Then, the structure is complicated to raise a problem in the difficulty of control.

In the prior art, on the other hand, the power loss to be caused by a slip in the torque converter is prevented to improve the mileage and the power performance by arranging a lock-up clutch in parallel relationship with the torque converter and by engaging it in a lock-up range having a vehicle speed at a constant or higher value.

With the lock-up clutch being engaged, the engine and the automatic transmission are in the so-called "mechanically direct lock-up" so that the vibrations due to the torque fluctuations of the engine are transmitted to the whole structure of the vehicle to deteriorate the riding comfort. Generally, therefore, the vibrations due to the torque fluctuations of the engine are absorbed by a slip of the torque converter by determining the lock-up range, by engaging the lock-up clutch when the vehicle running state comes into the lock-up range, and by releasing the lock-up clutch at a lower vehicle speed.

Generally speaking, the vibrations caused by the engine grow more serious with the higher throttle opening. If the throttle opening is higher to some extent, the lock-up clutch is released. With a relatively low throttle opening, however, the engine vibrations may increase, whereupon the lock-up clutch is subjected to a slip control.

One example of this control is disclosed in Japanese Patent Laid-Open No. 157859/1982. The system disclosed in this Laid-Open is a transmission system which is connected to a variable cylinder engine so that the slip percentage of the lock-up clutch is increased in a partial cylinder running mode having a reduced number of cylinders for combustions. In this partial cylinder running mode, more specifically, the torque fluctuations are increased to perform the torque transmission mainly through the torque converter by increasing the slip of the lock-up clutch so that they are absorbed or decreased to prevent the deterioration of the riding comfort.

Incidentally, the aforementioned variable cylinder engine is intended to improve the mileage under a light load. A similar engine is exemplified by an engine equipped with a lean combustion device. This device increase the air/fuel ratio under the light load and is equipped with a swirl control valve (as may be shortly referred to as the "SCV") in an intake passage for establishing intense swirls in the cylinders so as to stabilize the lean combustion.

In these engines, the output torque is highly varied in accordance with the change in the number of combustion cylinders and the open/closed of the SCV so that their characteristics are varied. As the engine having the variable output torque characteristics, there is known an engine which is equipped with a supercharge so that its output torque characteristics are discontinuously augmented unlike before if the supercharger is operated.

The vehicle in which the automatic transmission is connected to an engine having highly variable output characteristics is followed by various technical problems in accordance with the change in the output characteristics. In the invention as disclosed in the aforementioned Laid-Open, for example, the disadvantages caused by the fluctuations of the engine torque are eliminated by increasing the slip percentage of the lock-up clutch.

Unlike the aforementioned invention, however, the vehicle having its automatic transmission connected to the aforementioned engine is accompanied by serious problems when the output characteristics are changed to the higher torque. This point is not disclosed in the least in the aforementioned Laid-Open.

For example, here will be described the behaviors of the engine and the automatic transmission when the number of combustion cylinders is to be increased.

The engine capable of varying the number of combustion cylinders has a main object to improve the mileage in a light load state when the throttle opening is relatively small, as has been described hereinbefore. Thus, the relation between the output rotational speed in the partial cylinder running mode, i.e., the input rotational speed of the automatic transmission and the torque is plotted by dash lines in FIG. 31.

If, on the contrary, the full cylinder running mode is invited as the throttle opening increases, the relation between the input rotational speed and the torque is plotted by dash lines in FIG. 31.

If the engine has a small throttle opening and runs in a partial cylinder running mode and if the speed ration e of the torque converter at that time is at "0.5", this running mode is indicated by point A in FIG. 31.

If the accelerator pedal is depressed from this state to augment the throttle opening, the running mode shifts to point B of FIG. 31 while assuming that the speed ratio e is constant. If, in this case, the running mode is changed to the full cylinder running mode as the throttle opening increases, the output characteristics of the engine are discontinuously changed from the preceding lower torque ones to the higher torque ones so that the engine torque is discontinuously augmented. As a result, the rotational speed of the input member, i.e., the pump impeller of the torque converter is abruptly augmented to approximate the speed ratio e temporarily to "0", as indicated by point C in FIG. 31.

Since, in this state, the torque ratio of the torque converter rises, the turbine runner as an output member establishes a high torque to have an increased rotational speed so that the speed ratio e is returned to "0.5", as indicated by point D in FIG. 31.

If the engine torque is thus abruptly augmented, there occurs the so-called "temporary and abrupt rise of the engine rotational speed".

If this rise occurs, a driver generally releases the accelerator pedal to reduce the throttle opening so that the running mode is shifted to point E of FIG. 31. If, in this case, the running mode is shifted to the partial cylinder one as a result of the reduction in the throttle opening, the torque is further decreased, as indicated by point F in FIG. 31.

The operations thus far described will be described while stressing the actions of the driver. If the driver depresses the accelerator pedal to augment the torque, the engine torque is continuously augmented at first on the basis of the torque characteristics in the partial cylinder running mode. If, however, the throttle opening is large, the engine running mode is changed from the partial to full cylinder ones. As a result, the output characteristics are changed to the higher mode to augment the engine torque, and the torque ratio of the torque converter is temporarily augmented to increase the driving force abruptly.

This increase in the driving force exceeds the intention of the driver, and he instantly releases the accelerator pedal to reduce the throttle opening. The degree of release is sufficient to reduce the unintentional excessive driving force so that the throttle opening is considerably reduced. As a result, the running mode is changed from the full to partial cylinder ones. Since the torque reduction in this case is due to the discontinuous reduction of the engine torque, it may frequently exceeds the driver's intention so that the driver depresses again the accelerator pedal.

FIG. 32 plots the changes in the aforementioned throttle opening $\theta$, engine torque $T_E$ and vehicle driving force $T_A$ in time series. If the throttle opening is started at time $t_1$ to increase to a predetermined value at time $t_2$, the running mode is changed to the full cylinder one so that the engine torque $T_E$ and the vehicle driving force $T_A$ abruptly rise (at time $t_3$). The throttle opening $\theta$ continuously rises to time $t_4$, but the vehicle driving force $T_A$ is held substantially at a constant value as the torque ratio of the torque converter decreases.

Since the vehicle driving force $T_A$ thus abruptly rises, the throttle opening is decreased at time $t_4$ so that the engine torque $T_E$ and the vehicle driving force $T_A$ are accordingly decreased (at time $t_5$). Then, the running mode is changed to the partial cylinder one so that the engine torque $T_E$ and the vehicle driving force $T_A$ are further decreased within a short time period to time $t_6$.

More specifically, if the number of combustion cylinders is increased with the increase in the throttle opening to change the output characteristics of the engine, the vehicle driving force $T_A$ extremely rises, as indicated by $\Delta T_A$ in FIG. 32, so that the drivers may feel physical disorder.

If the output torque characteristics changes, as described above, the unintended driving force is generated so that the driver has to frequently repeat the depressing and releasing actions of the accelerator pedal, thus causing a problem that the vehicle is difficult to drive.

Incidentally, the change in the output torque characteristics may occur not only in the aforementioned variable cylinder engine but also in the lean combustion engine or in the engine equipped with the supercharger. The above-specified problems may likewise occur in the vehicle in which the automatic transmission is connected to such engine.

In the torque converter having the lock-up clutch, on the other hand, the lock-up clutch is generally released, if the throttle opening is large, to prevent the vibrations due to the torque fluctuations of the engine. When, therefore, the engine torque is stepwise augmented with the increase in the throttle opening, the lock-up clutch is released. As a result, the torque transmission capacity of the entire transmission mechanism composed of the lock-up clutch and the torque converter is reduced to cause the abrupt rise of the engine rotational speed.

SUMMARY OF THE INVENTION

An object of the present invention is to achieve an excellent running performance and a low fuel consumption.

Another object of the present invention is to prevent abrupt rise of engine rotational speed and the frequent operations of an accelerator pedal.

A further object of the present invention is to suppress the vibrations without deteriorating power performance.

These objects can be achieved in an automatic transmission connected to an engine and comprising: a fluid coupling for transmitting a torque between an input member and an output member; a lock-up clutch adapted to be selectively engaged with and released from the input member; and a variable capacity type viscous coupling arranged in series between the lock-up clutch and the output member, by detecting the output state of the engine when the lock-up clutch is engaged and by determining the torque transmission capacity of the variable capacity type viscous coupling on the basis of the output state of the engine. Thus, the control system of the present invention comprises: lock-up detecting means for detecting that the lock-up clutch is engaged; output state detecting means for detecting an output state of the engine; torque transmission capacity determining means for detecting a torque transmission capacity of the variable capacity type viscous coupling in accordance with the output state of the engine which is detected by the output state detecting means, if the lock-up detecting means detects that the lock-up clutch is engaged; and a mechanism for setting the torque transmission capacity of the variable capacity type viscous coupling to the determined torque transmission capacity.

The output state detecting means can detect the output state of the engine on the basis of the throttle opening. If, moreover, the engine is equipped with means for changing at least two output characteristics, i.e., the higher characteristics and lower characteristics, the output state detecting means can be equipped with means for detecting the output characteristics of the engine.

The torque transmission capacity determining means of the present invention can be equipped with means for determining the torque transmission capacity of the case in which the output characteristics of the engine are the higher ones, to a smaller value than that of the case in which the output characteristics are the lower ones. On the contrary, the torque transmission capacity determining means of the present invention can be equipped with means for determining the torque transmission capacity of the case in which the output characteristics of the engine are the lower ones, to a smaller value than that of the case in which the output characteristics are the higher ones.

The above and further objects and features of the present invention will more appear from the following detailed description when the same is read in connection with the accompanying drawings. It is expressly understood, however, that the drawings are for the purpose of illustration only and are not intended to define the limits of the invention.

DETAILED DESCRIPTION OF THE PREFERRED EMBODIMENTS

Figure 1:
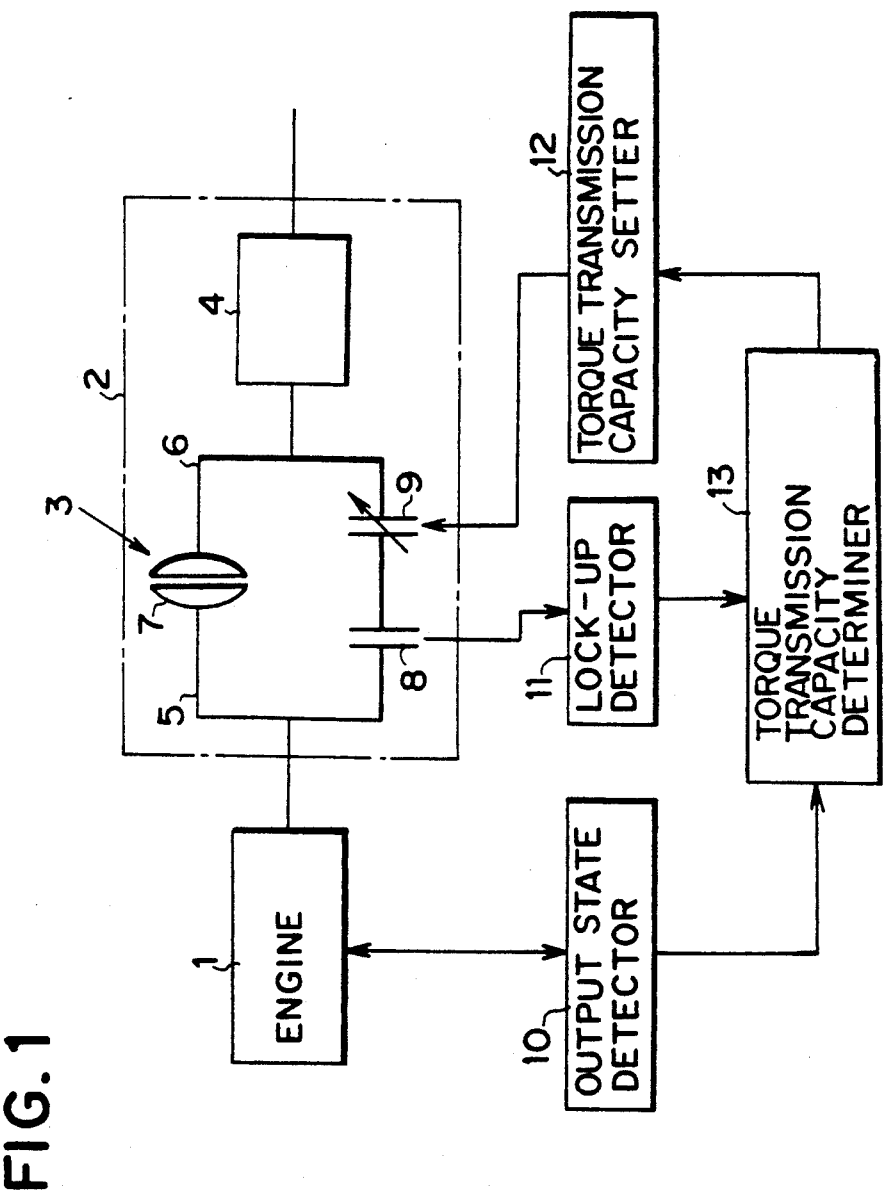
FIG. 1 is a block diagram showing a basic structure of the present invention.

FIG. 1 is a block diagram showing a control system according to the present invention. An engine 1 is exemplified by an engine which is able to change the output characteristics to at least two modes of higher and lower ones such as an ordinary engine having its output changing in accordance with a degree of throttle opening, a variable cylinder engine capable of changing the number of cylinders to cause combustions, a lean burn engine capable of running at a high air/fuel ratio, or an engine equipped with a supercharger.

To the engine 1, there is connected an automatic transmission 2 which has a transmission mechanism 3 and a gear change mechanism 4. Moreover, the transmission mechanism 3 comprises a torque converter 7 for torque transmissions between an input member 5 connected to the engine 1 and an output member 6 connected to the gear change mechanism 4, a lock-up clutch 8 adapted to be engaged with and released from the input member 5, and a variable capacity type viscous coupling 9 arranged in series with the lock-up clutch 8.

The engine 1 is controlled to have its output characteristics changed from lower to higher ones, namely, to have its output increased or decreased in accordance with throttle opening or to have its running mode changed to a full-cylinder run or a stoichiometric combustion when the throttle opening reaches a predetermined value. Thus, the control system is equipped with an output state detector 10 for detecting the output state thereof. On the other hand, the lock-up clutch 8 is engaged, for example, in a lock-up range, in which the vehicle speed is over a predetermined value whereas the throttle opening is below a predetermined value. Further included in the control system is a lock-up detector 11 for detecting that the lock-up clutch 8 is engaged.

Moreover, the variable capacity type viscous coupling 9 transmits torque through shearing resistance of highly viscous fluid confined therein and has its torque transmission capacity varied by changing either the pressure of the highly viscous fluid or the gap between a pair of rotary members for imparting the shearing force to the highly viscous fluid. Further included in the control system is a torque transmission capacity setter 12 for varying the torque transmission capacity.

Further included in the control system is a torque transmission capacity determiner 13 for outputting a command signal to the torque transmission capacity setter 12. The torque transmission capacity determiner 13 determines the torque transmission capacity in accordance with the output state of the engine 1 while the lock-up clutch 8 is engaged. For example, the torque transmission capacity for a larger throttle opening is determined to be a smaller value than that when the throttle opening is smaller. Alternatively, the torque transmission capacity is decreased or increased if the output characteristics are changed from lower to higher ones, as exemplified when a partial cylinder running mode is changed to a full-cylinder running mode.

The engine 1 has its output adjusted by the driver's operation of an accelerator pedal, and the output torque is increased or decreased according to the output characteristics at that time. In the engine 1 capable of having its output characteristics changed, moreover, the output characteristics are changed when the throttle opening exceeds a predetermined value, so that the engine torque stepwise increases. The output state detector 10 detects a change, if any, in the output state of the engine 1 to output a signal.

On the other hand, the lock-up detector 11 detects the engagement, if any, of the lock-up clutch 8 to output a signal.

The torque transmission capacity determiner 13 determines the torque transmission capacity in accordance with the data of the signals, if inputted, from those detectors 10 and 11 and outputs a signal to the torque transmission capacity setter 12 so that the torque transmission capacity of the aforementioned viscous coupling 9 may be the determined one. In response to the signal, the viscous coupling 9 is controlled by the torque transmission capacity setter 12 so that its torque transmission capacity reaches the determined one.

The torque capacity of the transmission mechanism 3 in its entirety is determined on the basis of both the torque capacity of the torque converter 7 and the torque transmission capacity of the viscous coupling 9, and it takes the higher value as the latter two increase. Thus, the torque capacity of the entire transmission mechanism 3 is varied by varying the torque transmission capacity of the viscous coupling 9, as described above.

Therefore, when the engine output rises as the throttle opening increases, the maximum engine torque point can be exploited to improve the mileage and the running performance by reducing the torque transmission capacity. If, moreover, the torque transmission capacity is increased when the output characteristics of the engine 1 is changed to higher one, its rotational speed is not abruptly raised to prevent speed ratio from dropping and torque ratio from increasing. In other words, the driving force will not rise contrary to the intention of the driver. If, moreover, the torque transmission capacity is reduced when the output characteristics of the engine 1 is changed to higher one, the torque transmission capacity of the viscous coupling 9 arranged in parallel relationship with the torque converter 7 is reduced to raise the torque ratio of the torque converter 7 and accordingly to increase the turbine torque so that an excellent running performance can be achieved. If, on the other hand, the output characteristics of the engine 1 are the lower ones, the torque transmission capacity of the viscous coupling 9 is relatively increased to reduce the slip of the transmission mechanism 3 in its entirety so that an efficient torque transmission can be achieved to improve the mileage. Since, in this case, the viscous coupling 9 has no torque amplifying action, the action of the transmission mechanism 3 for absorbing or reducing the vibrations caused the torque fluctuations of the engine 1 exceeds that of the case in which the torque is transmitted only through the torque converter 7, so that the riding comfort of the vehicle can be improved.

Figure 2:
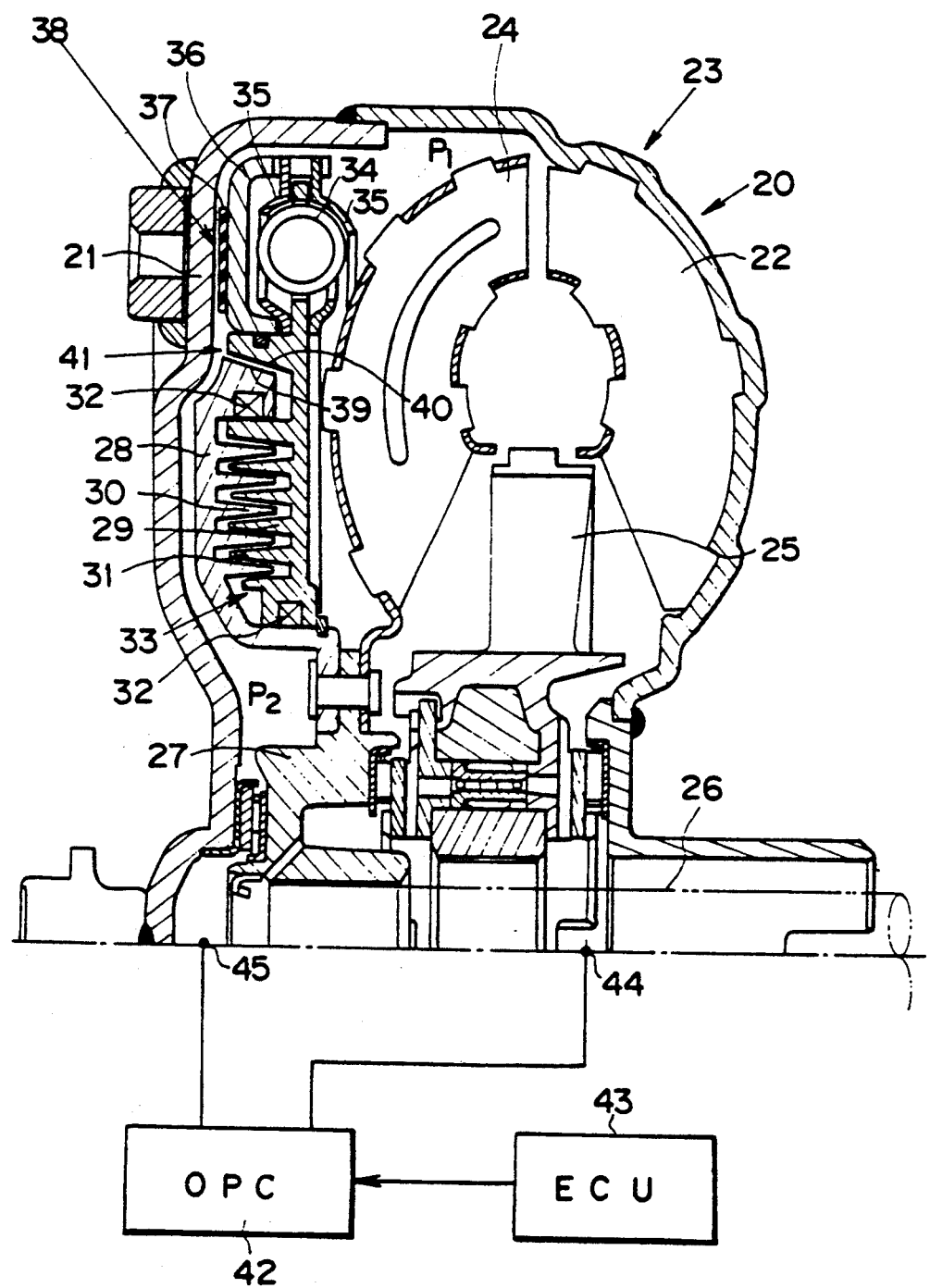
FIG. 2 is a sectional view showing a portion of one example of a transmission mechanism of an automatic transmission to which the present invention is to be applied.

A transmission mechanism shown in FIG. 2 embodies the transmission mechanism 3 which has been described with reference to FIG. 1. A torque converter 20 has its housing 23 formed of a front cover 21 and the casing of a pump impeller 22. In the housing 23, there are disposed a turbine runner 24 for receiving the torque from the pump impeller 22 through AT oil, and a stator 25 for adjusting the flow direction of the AT oil confined in the housing 23. Moreover, the aforementioned turbine runner 24 is fixed on a hub 27 which is splined to an output shaft 26. A disc-shaped driven member 28 is fixed on that hub 27, and it is interposed between the turbine runner 24 and the front cover 21.

Between the driven member 28 and the turbine runner 24, on the other hand, there is interposed an annular drive member 29 which can move in the axial direction. The opposed faces of the disc-shaped driven member 28 and the drive member 29 are respectively formed with many annular projections 30 and 31 which are concentric and have sections in comb-tooth shape so that they are fitted in each other. The sections of those annular projections 30 and 31 are tapered, as shown, such that their gap becomes the narrower while their lap length being the longer as they mesh each other the deeper.

Between the opposed driven member 28 and drive member 29, moreover, there is formed a cavity which has its inner and outer circumferences sealed up by X-shaped seals 32 and 32. The cavity confines therein highly viscous oil such as silicon oil and a suitable amount of air, thus forming a viscous coupling 33 of a variable capacity type viscous coupling. If the driven member 28 and the drive member 29 are brought toward each other, the highly viscous oil confined inbetween is pressurized, and the gap between the two annular projections 30 and 31 are narrowed to raise shearing resistance of the highly viscous oil and to increase the lap length thereby to increase the torque transmission capacity of the viscous coupling 33.

On the other hand, the annular driven member 29 is provided at its circumferential edge with a plurality of coil springs 34 of a torsional damper mechanism, which are supported by spring guide plates 35 and 35 for damping the rotational fluctuations of the drive member 29 to suppress the vibrations. By the spring guide plates 35 and 35, moreover, there is supported an annular clutch disc 36 having a C-shaped section, which is allowed to move in the axial direction. A friction member 37 is adhered to the outer face (i.e., the lefthand face, as viewed in FIG. 2) of the clutch disc 36. Thus, this clutch disc 36 and the front cover 21 of the housing 23 form together a lock-up clutch 38.

This lock-up clutch 38 has its ON/OFF controls performed by the oil pressure in accordance with a predetermined lock-up map.

Moreover, the disc-shaped driven member 28 and the drive member 29 constituting the viscous coupling 33 are formed at their respective circumferential edges with annular taper faces 39 and 40, which are mechanically engaged to form a cone clutch 41. This cone clutch 41 can connect the driven member 28 and the drive member 29 mechanically without any slip.

For the ON/OFF control of the lock-up clutch 38 and for the control of the torque transmission capacity of the viscous coupling 33, there are provided an oil pressure control unit (as may be shortly referred to as "OPC") 42 and an electronic control unit (as may also be referred to as "ECU") 43.

The oil pressure control 42 is given: a function to change an oil passage for feeding the oil pressure from a port 44 communicating with the turbine 24 more than the lock-up clutch 38 or, on the contrary, from a port 45 communicating with the front cover 21 more than the lock-up clutch 38; and a function to adjust a pressure difference ($P_1 - P_2$) between those two portions. The oil pressure circuit for those functions is simply exemplified in FIG. 3.

The aforementioned ports 44 and 45 are connected to a pressure regulating/changing unit 46. This unit 46 is fed with a converter oil pressure $P_c$ which is established by an oil pump 47 and regulated by a secondary regulator valve 48. Moreover, the pressure regulating/changing unit 46 is composed mainly of a single valve or a plurality of valves. The unit 46 changes the oil passage to feed the converter oil pressure $P_c$ to the port 44 and discharge it from the port 45 or, on the contrary, to feed the converter oil pressure $P_c$ to the port 45 and discharge it from the port 44 on the basis of a signal pressure $P_{s1}$, and regulates the pressure to be discharged from the port 45 in accordance with the level of the signal pressure $P_{Si}$.

Figure 3:
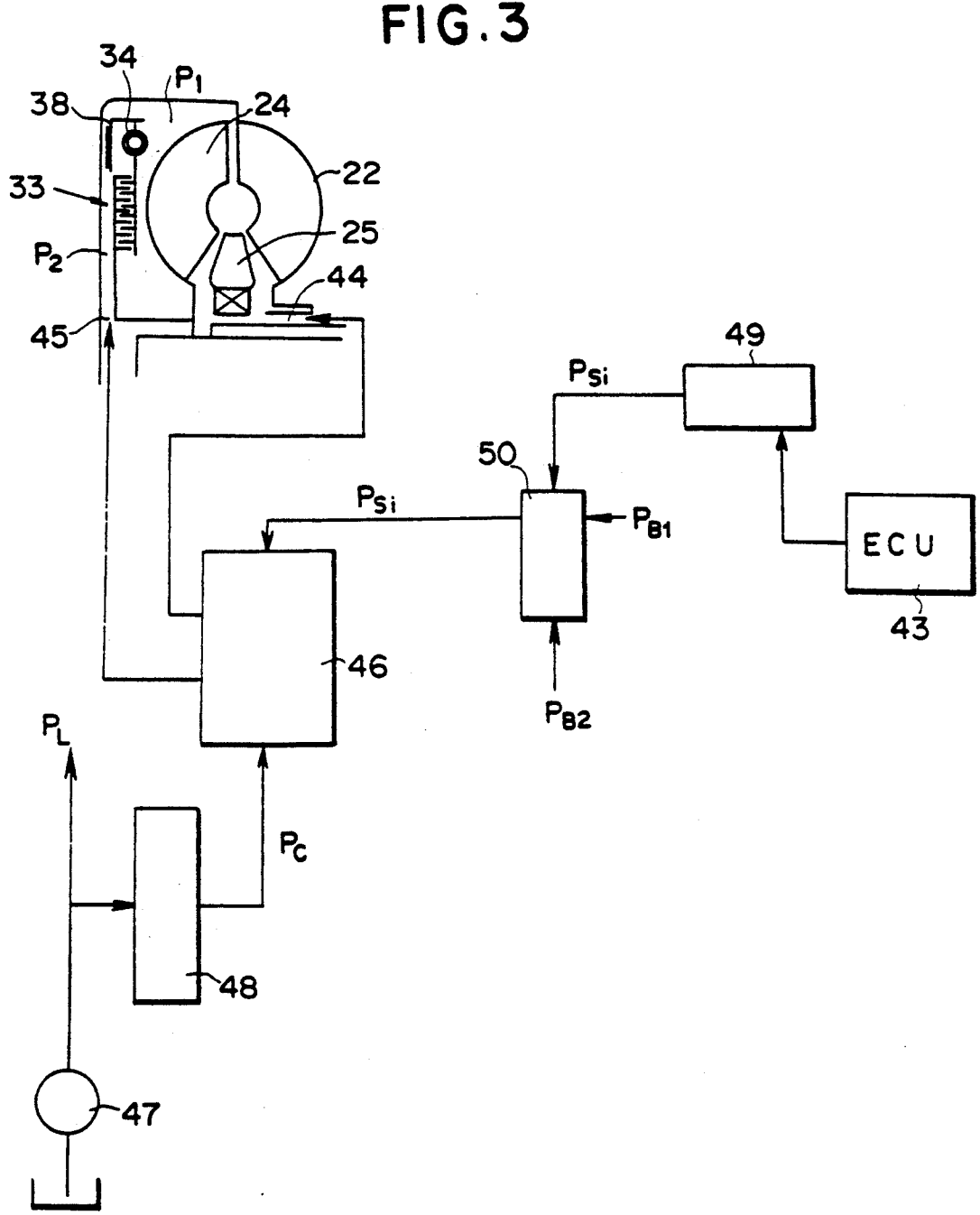
FIG. 3 is a block diagram showing one example of an oil pressure circuit for controlling the torque transmission capacity of a viscous coupling.

The means for establishing the signal pressure $P_{Si}$ is exemplified in FIG. 3 by a signal pressure generator 49 including a solenoid valve. The signal pressure generator 49 outputs the oil pressure, which is generated in a solenoid valve such as a linear solenoid valve or a duty control solenoid valve capable of being electrically regulated, unchangeably as the signal pressure $P_{Si}$, or the oil pressure which is regulated by another valve on the basis of the oil pressure generated by a solenoid valve, as the signal pressure $P_{Si}$.

The signal pressure $P_{Si}$ thus outputted from the signal pressure generator 49 is inputted to the aforementioned pressure regulating/changing unit 46 through a relay valve 50 which is turned on or off in response to oil pressures $P_{B1}$ and $P_{B2}$ for engaging frictional engagement means such as a brake in the not-shown automatic transmission.

In the structure shown in FIG. 3, more specifically, the pressure difference ($P_1 - P_2$) across the lock-up clutch 38 is raised by lowering the pressure at the port 45 for the higher signal pressure $P_{Si}$, to engage the lock-up clutch 38 and to bring the aforementioned driven member 29 and drive member 28 toward each other thereby to increase the torque transmission capacity of the viscous coupling 33. If, on the contrary, the signal pressure $P_{Si}$ is lowered, the direction of feeding the converter oil pressure $P_C$ is reversed at the pressure regulating/changing unit 46 to feed the converter oil pressure $P_C$ to the port 45 and discharge it from the port 44. In this case, the lock-up clutch 38 is released.

As has been described hereinbefore, the oil pressure circuit shown in FIG. 3 is controlled directly by controlling the solenoid valve in the signal pressure generator 49. One example of the control means of the case in which the solenoid valve is exemplified by a linear solenoid valve, is shown in a block diagram in FIG. 4.

Figure 4:
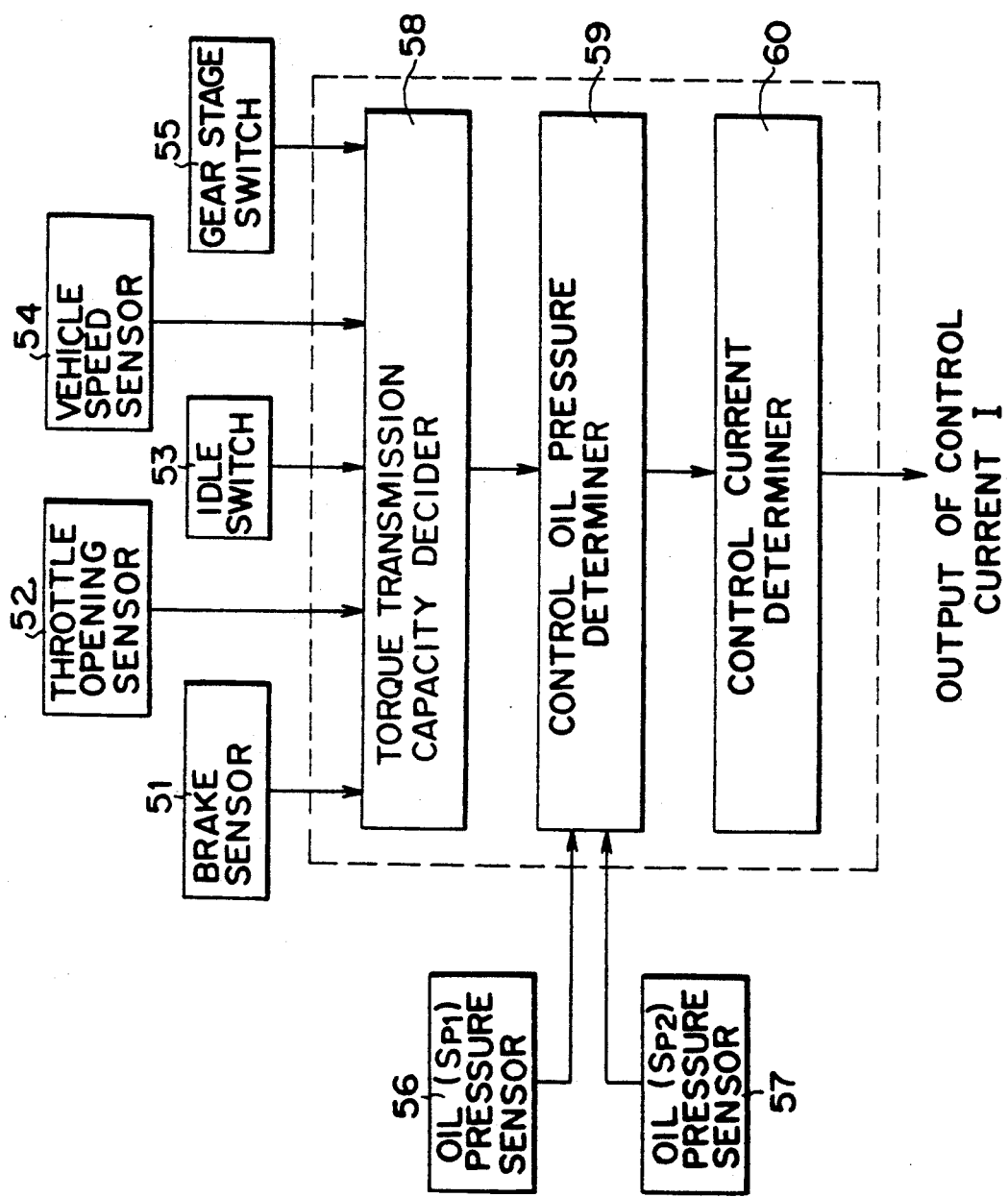
FIG. 4 is a block diagram for explaining main control means in an electronic control unit.

The control means, as shown in FIG. 4, functionally forms a portion of the electronic control unit 43 composed mainly of a microcomputer and corresponds mainly to the torque transmission capacity determiner 13 of the means shown in FIG. 1. Specifically, the control means, as shown, is fed with a brake signal B from a brake sensor 51, a throttle opening signal $\theta$ from a throttle opening sensor 52, an idle signal i from an idle switch 53, a vehicle speed signal V from a vehicle speed sensor 54, a gear stage signal G from a gear stage switch 55, oil pressure signals $SP_1$ and $SP_2$ from oil pressure sensors 56 and 57, and other signals (not shown). On the other hand, the control means comprises a torque transmission capacity decider 58 for deciding a torque transmission capacity to be set at the aforementioned viscous coupling 33, a control oil pressure determiner 59 and a control current value determiner 60. Thus, the control means determines and outputs a control current value for controlling the solenoid valve of the signal pressure generator 49 on the basis of the above-enumerated signals. Specifically, the torque transmission capacity decider 58 arithmetically decides the torque transmission capacity to be set in the viscous coupling 33 based upon the inputted individual signals. The control oil pressure determiner 59 determines the oil pressure necessary for achieving the torque transmission capacity obtained at the torque transmission capacity decider 58, i.e., the pressure difference across the lock-up clutch 38. The control current value determiner 60 determines the current value necessary for achieving that pressure difference.

Figure 5:
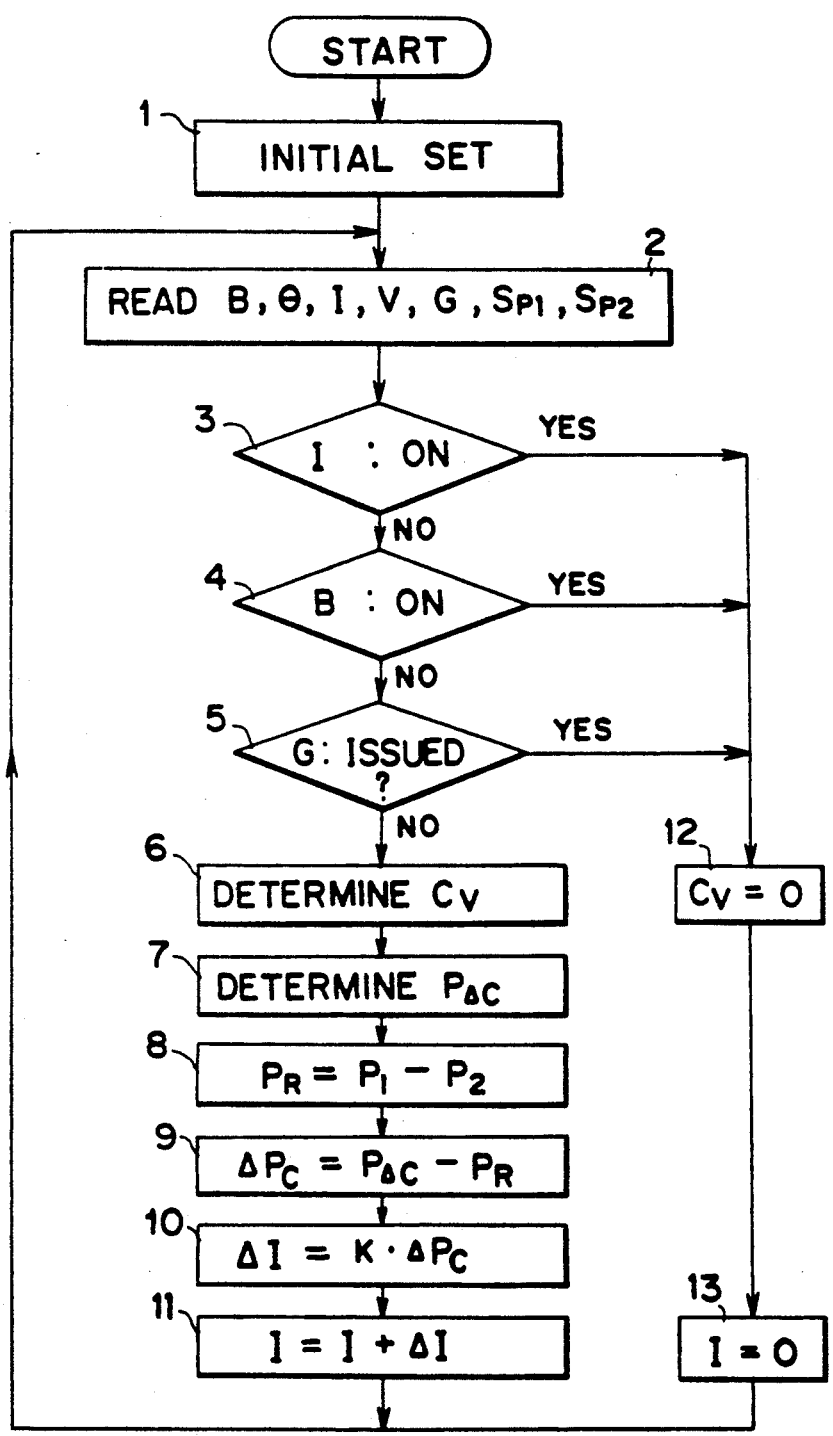
FIG. 5 is a flow chart showing a control routine of the torque transmission capacity on the basis of the throttle opening.

FIG. 5 is a flow chart showing a control routine for controlling the torque transmission capacity on the basis of the throttle opening. At first, an initial setting is executed at Step 1, and the values of the individual detected signals (B, $\theta$, i, V, G, $SP_1$ and $SP_2$) are then read in at Step 2.

At Step 3, it is decided from the idle signal i whether or not the idle switch 53 is ON. If the idle switch 53 is OFF, namely, if the answer of Step 3 is "NO", the control routine advances to Step 4

At Step 4, it is decided whether or not the brake switch 51 is ON. If the brake switch 51 is OFF, the routine advances to Step 5.

At Step 5, it is decided whether or not the gear stage signal G is issued. If NO, the routine advances to Step 6, at which a value $C_V$ indicating the torque transmission capacity is determined. This value $C_V$ is determined according to the relation among the throttle opening $\theta$, the vehicle speed V and the gear stage G, and it takes the larger value for the smaller throttle opening $\theta$, the higher vehicle speed V and the higher gear stage G.

Figure 6:
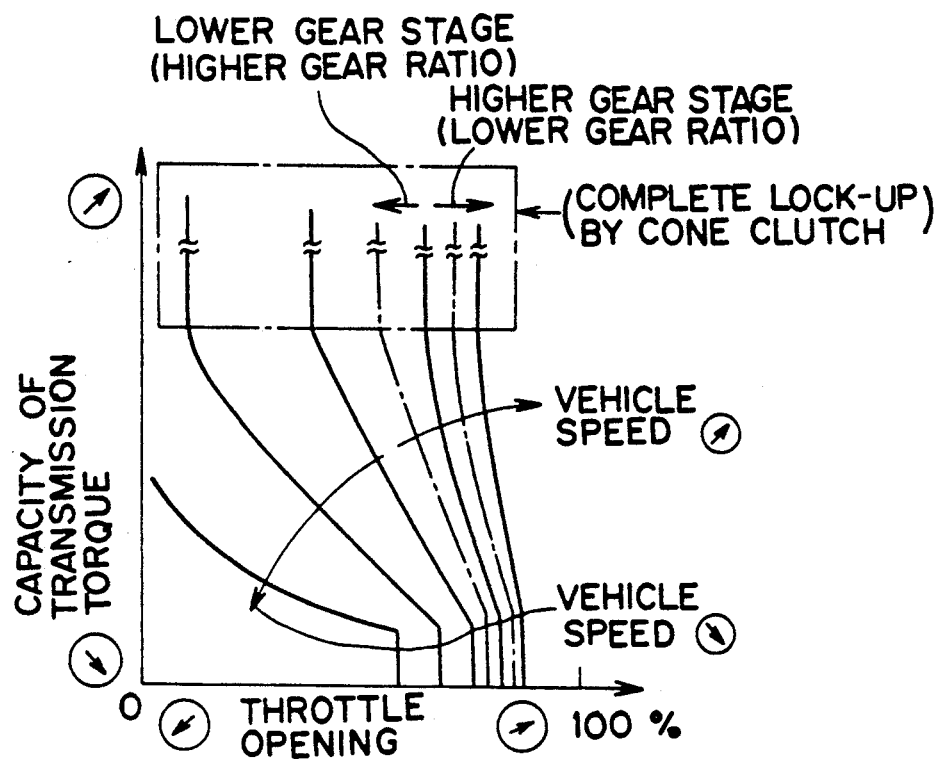
FIG. 6 is a map plotting the relations between the throttle opening and the torque transmission capacity.

This relation will be described in more detail in the following. The torque transmission capacity $C_V$ is determined on the basis of a map, as shown in FIG. 6. Specifically, FIG. 6 is a diagram plotting the relation between the torque transmission capacity $C_V$ and the throttle opening $\theta$ by using the vehicle speed V as a parameter. In the so-called "slip range" between the complete release and the complete engagement of the lock-up clutch 38, the torque transmission capacity $C_V$ and the throttle opening $\theta$ are set to be inversely proportional. It is further set that the decrease in the torque transmission capacity according to the increase in the throttle opening $\theta$ grows the more prominent for the high gear stage, i.e., the lower gear ratio. Specifically, the torque transmission capacity $C_V$ becomes lower as the throttle opening $\theta$ becomes higher, and it becomes higher as the throttle opening $\theta$ becomes lower.

Figure 7:
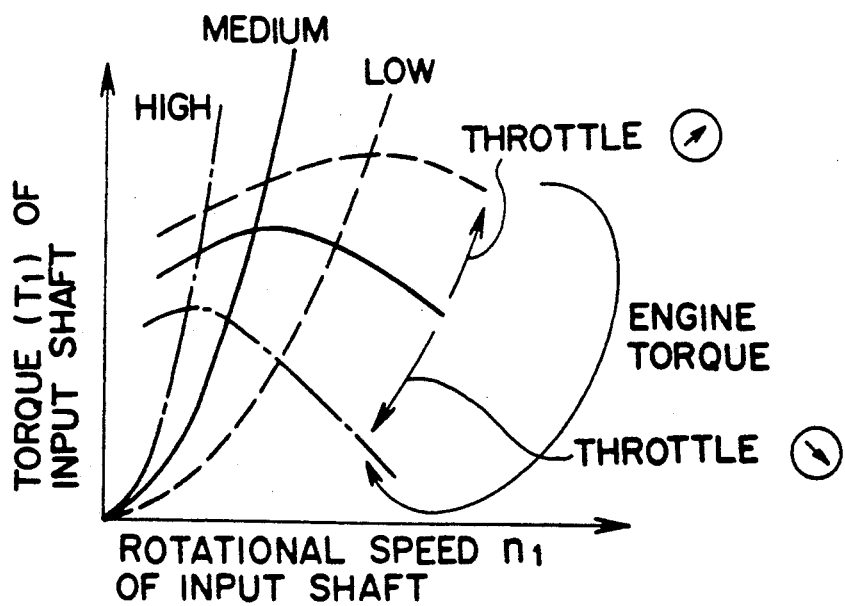
FIG. 7 is a diagram plotting the relations between the rotational speed and the torque of an input shaft.

Incidentally, the torque capacity (i.e., the converter capacity) of the torque converter in its entirety is determined on the basis both of a torque capacity $T_V$ which is determined according to the structure of the torque converter body constructed of the pump impeller 22, the turbine runner 24 and the stator 25, and of the torque transmission capacity $C_V$ of the viscous coupling 33, so that it is increased or decreased in accordance with the torque transmission capacity $C_V$ because the former, i.e., the torque capacity $T_V$ takes a constant value for each speed ratio. Since the torque transmission capacity $C_V$ and the throttle opening $\theta$ are in the relationship shown in FIG. 6, the rotational speed $n_1$ and torque $T_1$ of the input shaft when the torque transmission capacity $C_V$ is varied are in the relationship shown in FIG. 7. As could be known from FIG. 7, the range of the maximum engine torque can be effectively exploited for each throttle opening $\theta$.

Figure 8:
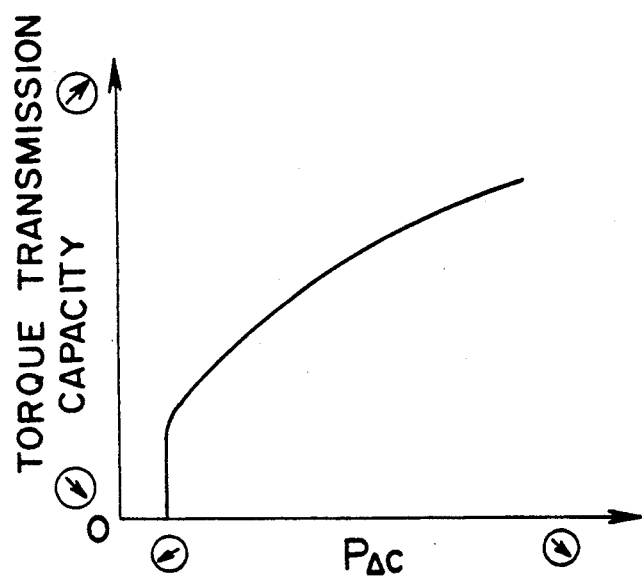
FIG. 8 is a diagram plotting the relations between the target pressure difference across a lock-up clutch and the torque transmission capacity.

After the torque transmission capacity $C_V$ has been determined as above, a target pressure difference $P\Delta_C$ is determined at Step 7. FIG. 8 is a map plotting the relation between the pressure difference $P\Delta_C$ between the pressures $P_1$ and $P_2$ in the torque converter 20 and the torque capacity. On the basis of this map, the target pressure difference $P\Delta_C$ is determined. At Step 8, moreover, the difference (i.e., actually measured pressure difference) $P_R (=P_1-P_2)$ between the measured values of the pressures $P_1$ and $P_2$ across the lock-up clutch 38 is operated.

At Step 9, the difference $\Delta P_C (=P\Delta_C - P_R)$ between the target value $P\Delta_C$ determined at Step 7 and the measured pressure difference $P_R$ determined at Step 8 is operated.

Figure 9:
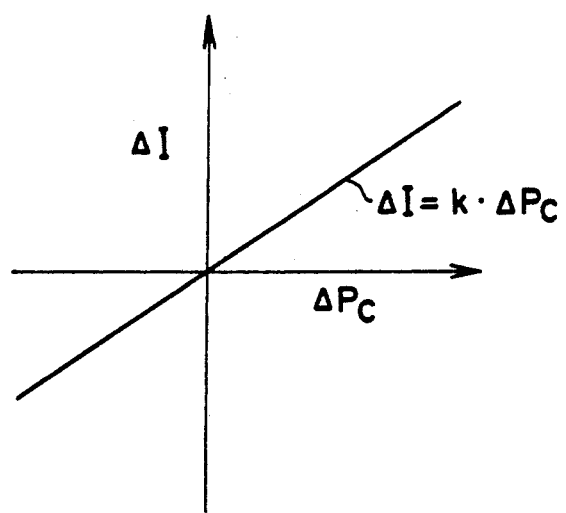
FIG. 9 is a diagram plotting the relation between a corrected current and the oil pressure obtained by the former.
Figure 10:
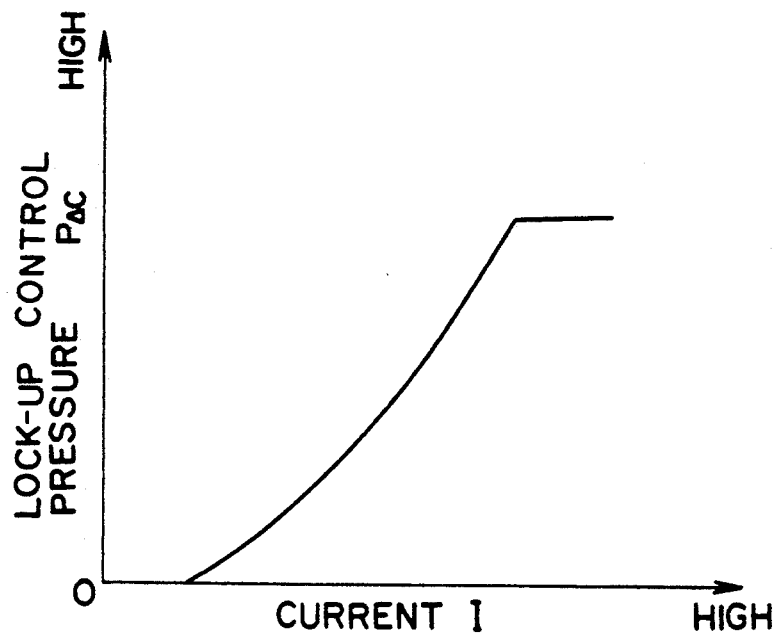
FIG. 10 is a diagram showing the relation between a current in a solenoid valve and a control pressure.

Next, at Step 10, a corrected current value $\Delta I$ is computed. The aforementioned hydraulic circuit shown in FIG. 3 can be constructed such that the signal pressure $P_{Si}$ is raised by increasing the current at the solenoid valve in the signal pressure generator 49, and such that the pressure difference set by the pressure regulating/changing unit 46 is raised with an increase in the signal pressure $P_{Si}$. In this case, the difference $\Delta P_C (=P\Delta_C - P_R)$ between the computed pressure difference $P\Delta_C$ and the measured pressure difference $P_R$ is in proportional relation to the corrected current value $\Delta I$, as shown ($\Delta I = k \cdot \Delta P_C$) in FIG. 9. At Step 10, therefore, the corrected current value $\Delta I$ is determined on the basis of that proportional relation. At subsequent Step 11, a current value having the corrected current value $\Delta I$ is replaced by a control current I and is outputted to the aforementioned signal pressure generator 49. In other words, the lock-up control pressure $P\Delta_C$ rises with an increase in the current I (as shown in FIG. 10).

If, on the other hand, the answer of Step 3 is "YES", namely, if the idle switch 53 is ON, the control routine advances to Step 12, at which the torque transmission capacity $C_V$ is set to "0". As a result, the torque capacity (i.e., the converter capacity) of the torque converter in its entirely is decreased to drop the input torque $T_1$ so that a vehicle equipped with a fuel injection system can decrease the fuel injection quantity at the idling time and can improve the mileage.

If, moreover, the brake switch 51 is ON so that the answer of Step 4 is "YES", the routine advances to Step 12, at which $C_V=0$. This is intended to prevent an engine stall by reducing the torque capacity of the torque converter in its entirety.

If, moreover, the answer of Step 5 is "YES" to decide that the automatic transmission is being shifted, the routine also advances to Step 12, at which $C_V=0$. As a result, the torque capacity of the whole torque converter is lowered during the shifting so that the shift can be smoothed.

In the torque converter having the aforementioned control system, as has been described hereinbefore, the torque transmission capacity $C_V$ of the viscous coupling 33 arranged in series with the lock-up clutch 38 is lowered if the throttle opening $\theta$ is large as at a starting point or at an abrupt acceleration, if the vehicle speed is low or if it uses the gear stages for low speed. As a result, the torque ratio of the whole torque converter can be raised to provide a sufficient driving force (or acceleration). Since, in this case, no slip occurs in the frictional clutch. i.e., the lock-up clutch 38, the so-called "judder" can be prevented to improve the riding comfort, and the AT oil (or fluid) can be prevented from being contaminated.

Figure 11:
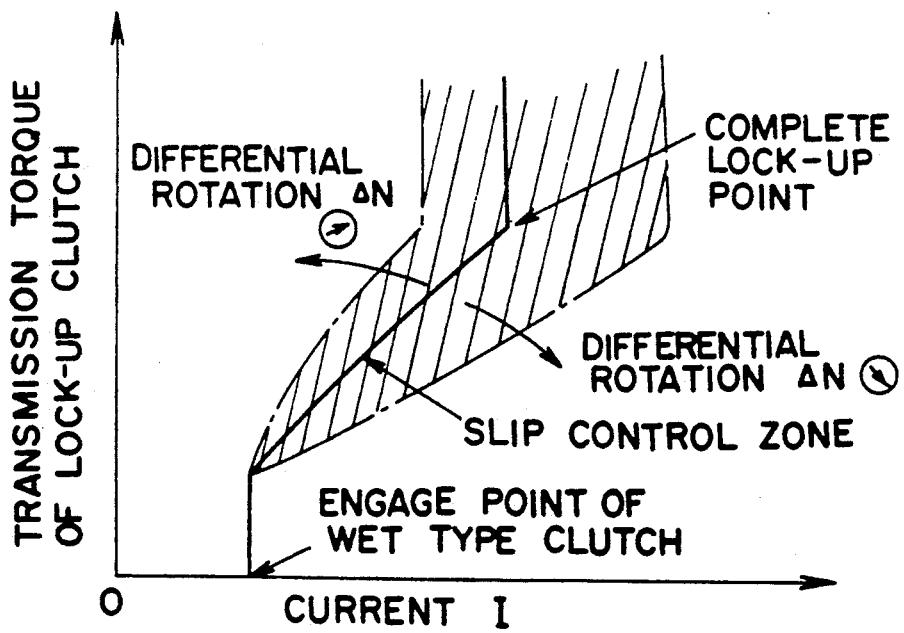
FIG. 11 is a diagram showing the range of a slip control by the viscous coupling.

If, on the contrary, the vehicle is running at a constant medium or high speed with a small throttle opening, the torque transmission capacity by the lock-up clutch 38 increases to enhance the efficiency of the entire torque converter. Moreover, the half lock-up range can be extended, as hatched in FIG. 11, to improve the mileage.

Next, here will be described the control of the torque transmission capacity of the torque converter in an automatic transmission which is connected to an engine having its output characteristics varied to two ways of high and low, such as a variable cylinder engine or an engine equipped with a supercharger.

Figure 12:
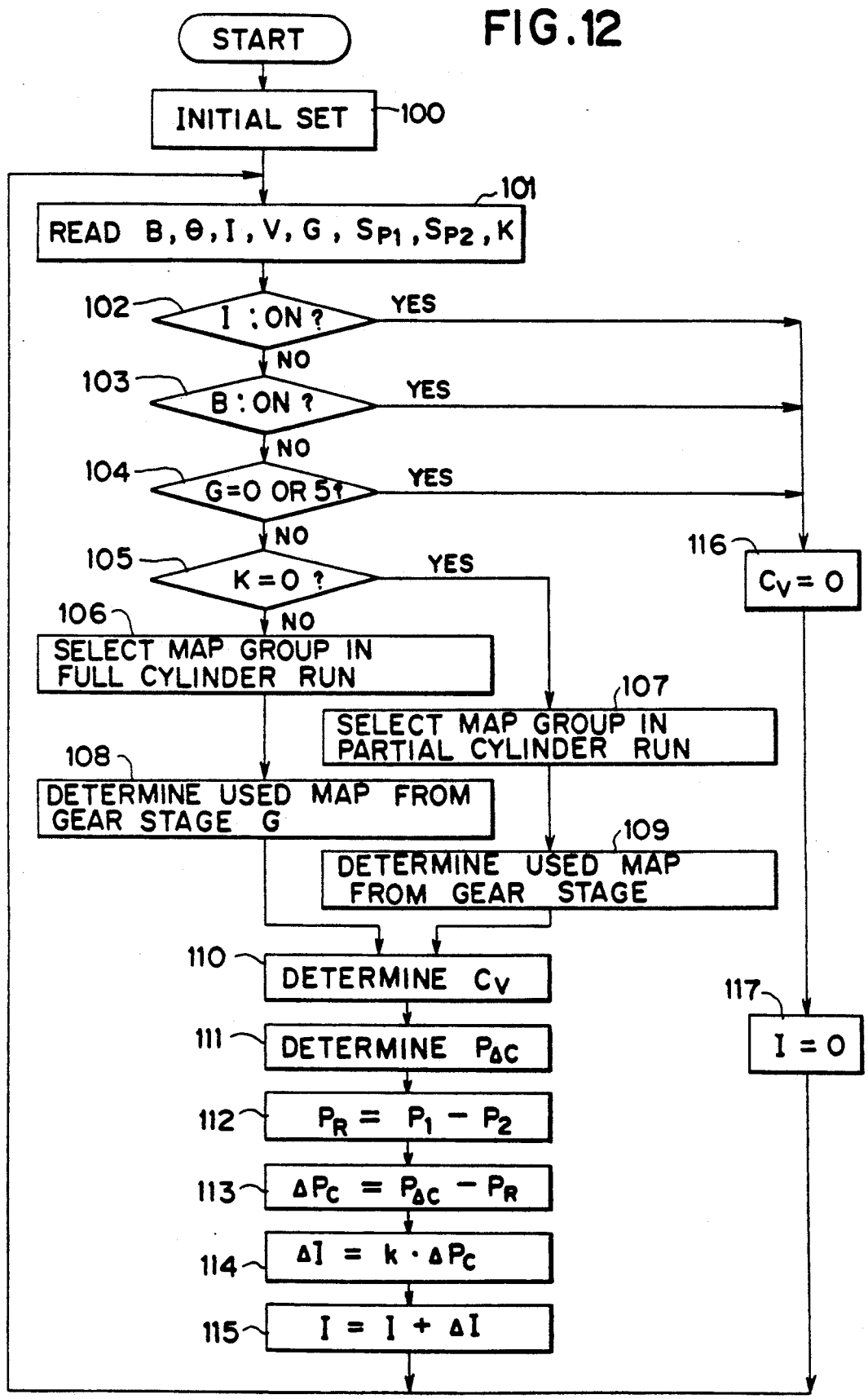
FIG. 12 is a flow chart showing a control routine of the torque transmission capacity on the basis of the output characteristics of a variable cylinder engine.

FIG. 12 is a flow chart showing one example of the control routine of the torque transmission capacity $C_V$ in the aforementioned viscous coupling 33 and directed to an automatic transmission which is connected to a variable cylinder engine. Moreover, the controls to be described in the following are used for the control of torque transmission capacity in the viscous coupling 33 which is arranged in series with the lock-up clutch 38, and presumes that the lock-up clutch 38 is engaged.

After an initial setting has been executed at Step 100, the individual detected signals are read in at Step 101. The signals are the brake signal B, the throttle opening $\theta$, the idle signal i, the vehicle speed signal V, the gear stage signal G, the oil pressure signals $S_{p1}$ and $S_{p2}$, and a cylinder number signal K and other signals.

At subsequent Step 102, it is decided whether or not the idle signal i is "ON". If "NO", the control routine advances to Step 103, at which it is decided whether or not the brake signal B is "ON". If "NO", the routine further advances to Step 104, at which it is decided whether the gear stage signal G is at "0" or "5". The neutral state is indicated if the gear stage signal G is at "0", and the shifting operation is indicated if the gear stage signal G is at "5". If neither of the two values, the routine advances to Step 105, at which it is decided whether or not the cylinder number signal K is at "0".

The partial cylinder running mode (e.g., the two-cylinder running mode) is indicated if the cylinder number signal K is at "0", and the full cylinder running mode (e.g., the four-cylinder running mode) is indicated if at "1". If, therefore, the answer of Step 105 is "NO", the routine advances to Step 106, at which the map group for the full cylinder running mode is selected. If, on the contrary, the answer is "YES", the routine advances to Step 107, at which the map group for the partial cylinder running mode is selected.

Figure 13:
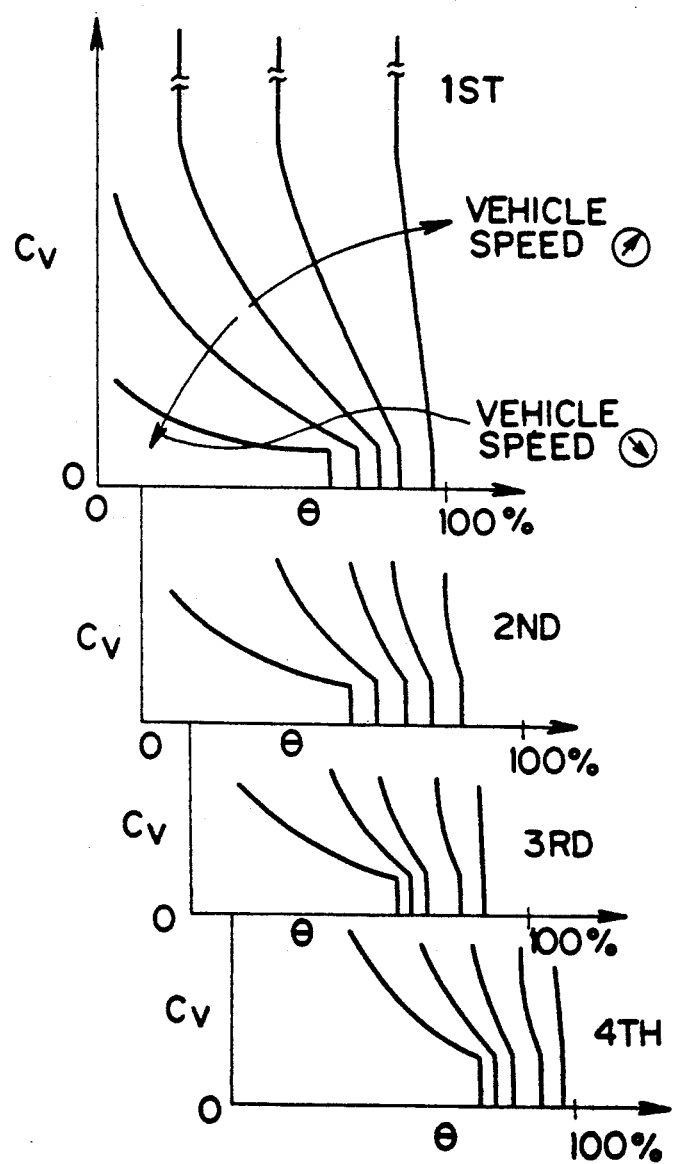
FIG. 13 is a diagram showing a map group for a full cylinder running mode for determining the torque transmission capacity.
Figure 14:
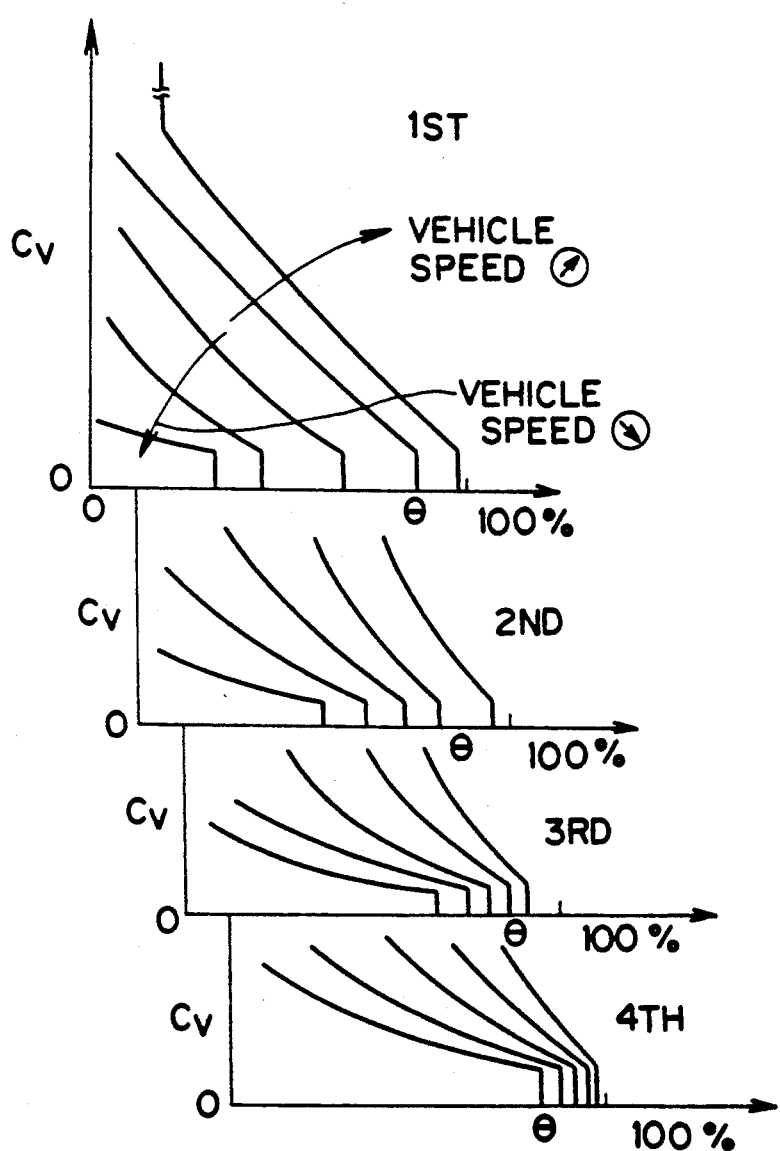
FIG. 14 is a diagram showing a map group for a partial cylinder running mode for determining the torque transmission capacity.

These map groups are exemplified in FIGS. 13 and 14, of which FIG. 13 presents the map group for the full cylinder running mode whereas FIG. 14 presents the map group for the partial cylinder running mode. The maps determine the relation between the throttle opening $\theta$ and the torque transmission capacity $C_V$ in the viscous coupling 33 by using the vehicle speed as a parameter and are prepared for the individual gear stages of 1st to 4th speeds.

The difference between the maps for the full and partial cylinder running modes is that the value of the torque transmission capacity $C_V$ for a predetermined throttle opening is generally set to a larger value in the map for the full cylinder running mode. This difference is exemplified in FIG. 15 plotting the characteristic curves for the full cylinder running mode (solid line) and the characteristic curves for the partial cylinder running mode (dash line) at a certain gear stage and at a certain vehicle speed.

Figure 15:
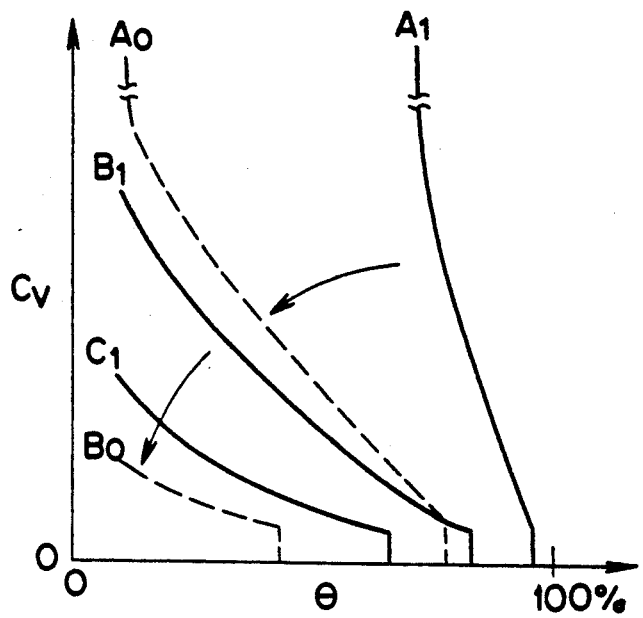
FIG. 15 is a $\theta$-$C_v$ diagram for explaining the difference between the maps for the full cylinder running mode and the partial cylinder running mode.

Specifically in FIG. 15, a characteristic curve $a_0$ corresponds to a characteristic curve $a_1$, and a characteristic curve $b_0$ corresponds to a characteristic curve $b_1$. No characteristic curve for the partial cylinder running mode is provided but $C_V=0$ for a characteristic curve $c_1$.

As could be seen from FIG. 15, therefore, the torque transmission capacity $C_V$ of the viscous coupling 33 in the full cylinder running mode in which the engine has higher output characteristics, is set to a larger value than that in the partial cylinder running mode. In other words, in the partial cylinder running mode having lower output characteristics, the torque amplification of the viscous coupling 33 is utilized by decreasing the torque transmission capacity in the viscous coupling 33 and increasing the torque transmission in the torque converter.

Since the maps are prepared for the individual gear stages, as described above, the map to be used is determined (at Step 108 or 109) for each running mode on the basis of the gear stage.

Figure 16:
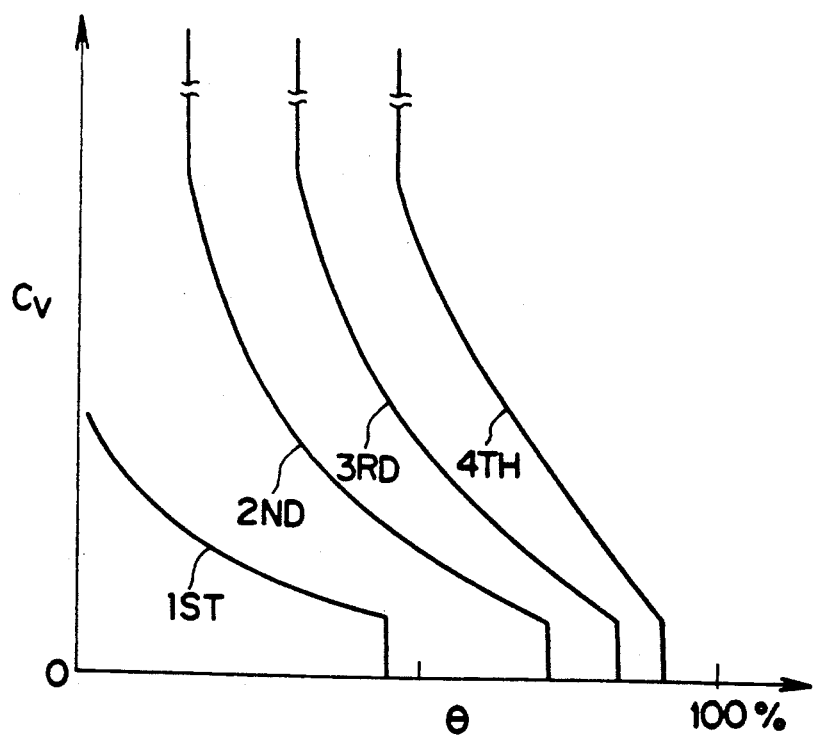
FIG. 16 is a $\theta$-$C_v$ diagram for explaining the difference between the characteristic curves at individual gear stages.

Here will be described the difference of the characteristic curves for each gear stage. FIG. 16 plots the relations between the throttle opening and the torque transmission capacity $C_V$ by using the gear stages as a parameter. As could be seen from FIG. 16, the torque transmission capacity $C_V$ is made the lower for the lower gear stage in each map. This is because the torque amplification of the viscous coupling 33 is sufficiently utilized by decreasing the torque transmission in the viscous coupling 33 and increasing the torque transmission in the torque converter, since the higher power performance is required for the lower gear stage.

After a map has been selected for each running mode, as described above, the torque transmission capacity $C_V$ according to the throttle opening and the vehicle speed at that time is determined at Step 110 from the selected map.

At subsequent Step 111, a target pressure difference $P\Delta_c$ is determined. Specifically, this target value $P\Delta_c$ is determined on the basis of the map of FIG. 8 like the foregoing example of control.

At Step 112, on the other hand, the difference (i.e., the actually measured difference) $P_R$ (=$P_1-P_2$) between the measured values of the pressures $P_1$ and $P_2$ across the lock-up clutch 38 is computed.

At Step 113, moreover, the pressure difference $\Delta P_c$ (=$P\Delta_c - P_R$) between the target value $P\Delta_c$ determined at Step 111 and the measured pressure difference $P_R$ determined at Step 112 is computed.

Next, at Step 114, the corrected current value $\Delta I$ is computed. Since this corrected current value $\Delta I$ is in proportion to the difference $\Delta P_c$, as shown in FIG. 9, it is determined at Step 114 on the basis of the proportional relation. At subsequent Step 115, the current value having the corrected current value $\Delta I$ is replaced by the control current I and outputted to the aforementioned signal pressure generator 49.

Then, the control routine is returned to upstream of the Step 101.

In the aforementioned controls flowing from Step 101 to Step 115, therefore, the running mode is changed from the partial to full cylinder ones as the throttle opening increases. If the output characteristics of the engine are changed to the higher ones, the torque transmission capacity $C_v$ of the viscous coupling 33 arranged in parallel relationship with the torque converter 20 increases. As a result, the torque capacity of the whole transmission mechanism connecting the engine and the automatic transmission increases to prevent any abrupt rise of the engine rotations and any abrupt acceleration.

This will be explained in the following with reference to the accompanying drawings.

Figure 17:
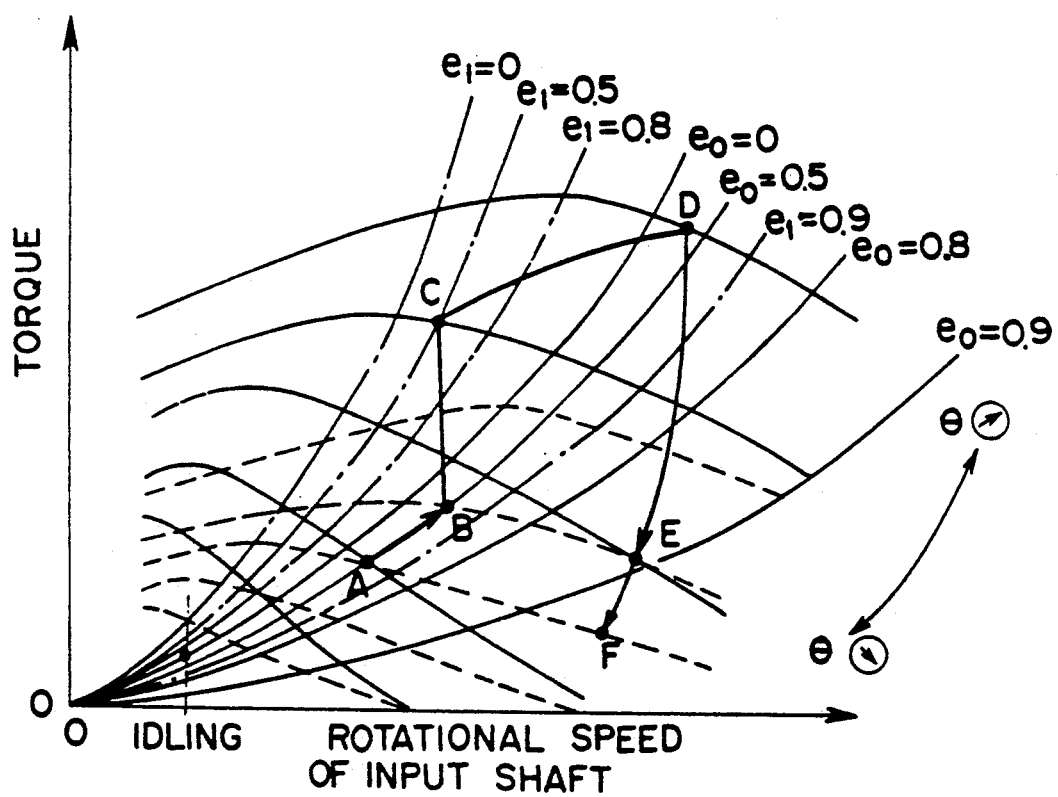
FIG. 17 is a diagram plotting the changes in the running mode, that is, a characteristic curve diagram plotting the relations between input rotational speed and torque.

Of the torque characteristics curves shown in FIG. 17, the solid curves indicate the torque characteristics in the full cylinder running mode, and the dash curves indicate the torque characteristics in the partial cylinder running mode. Moreover, reference letter $e_1$ designate the speed ratio of the case (i.e., $T_{c1} + T_v$) in which the torque transmission is effected both by the torque converter 20 and by the viscous coupling 33, and letter $e_0$ designates the speed ratio of the case (i.e., $T_{c1}$) in which the torque transmission is effected only by the torque converter 20.

Figure 18:
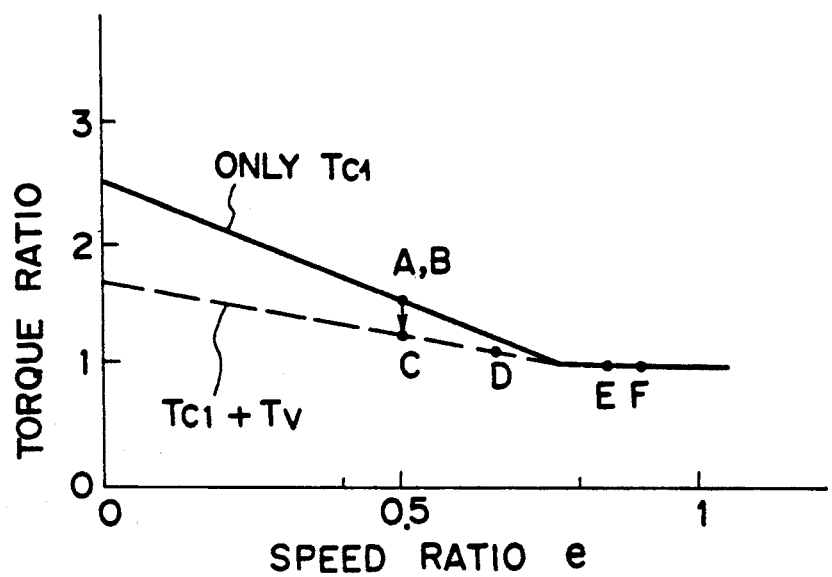
FIG. 18 is a diagram plotting the relations between speed ratio and torque ratio.

If the throttle opening is medium and in the partial cylinder running mode, if the torque transmission capacity $C_v$ in the viscous coupling 33 is at "0" and if the speed ratio $e_0$ is at "0.5", the running state is expressed at point A in FIG. 17. If the accelerator pedal is depressed from the above-specified state to increase the throttle opening, the running state shifts to point B of FIG. 17 with the assumption that the speed ratio is unchanged. If, at this time, the running mode is changed from the partial to full cylinder ones, the output torque characteristics are changed from those indicated by the dash lines to those indicated by the solid lines. As a result, the running mode shifts to point C, at which the solid torque characteristic curve having a throttle opening identical to the preceding one intersects the curve of $e_1 = 0.5$, so that the torque is stepwise (or discontinuously) changed. In other words, the torque capacity of the transmission mechanism in its entirety increases with the rise of the input torque to hold the speed ratio substantially constant so that the torque ratio t will be slightly changed, as shown in FIG. 18. As a result, the rotational speed of the engine will not abruptly rise. Since the speed ratio does not drop, the driving force of the vehicle will not abruptly rise. Incidentally, reference letters A to F appearing in FIG. 18 correspond to those A to F in FIG. 17.

As the vehicle speed increases with the increase in the torque, the speed ratio $e_1$ will rise so that the running state shifts to that indicated by point D in FIG. 17. If the driver then decides that a necessary speed is obtained, he can release the accelerator pedal to reduce the throttle opening so that the running state will shift to that indicated by point E. If the running mode is changed to the partial cylinder one, it will further shift to that indicated by point F in FIG. 17.

Figure 19:
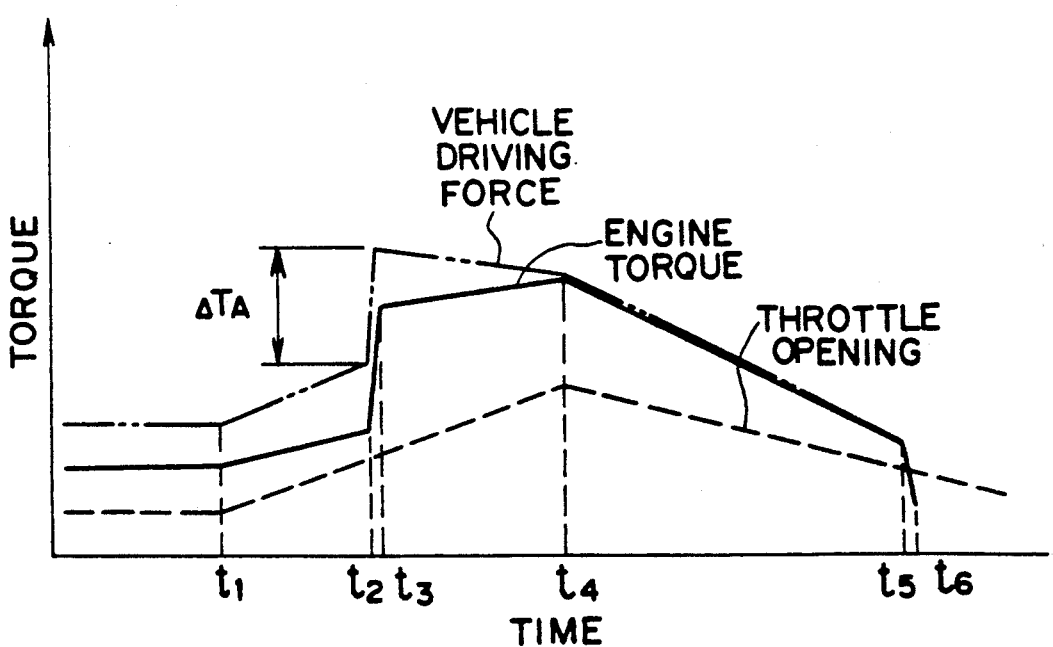
FIG. 19 is a diagram showing, in time series, the changes in the throttle opening, the engine torque and the vehicle driving force according to the present invention.
Figure 32:
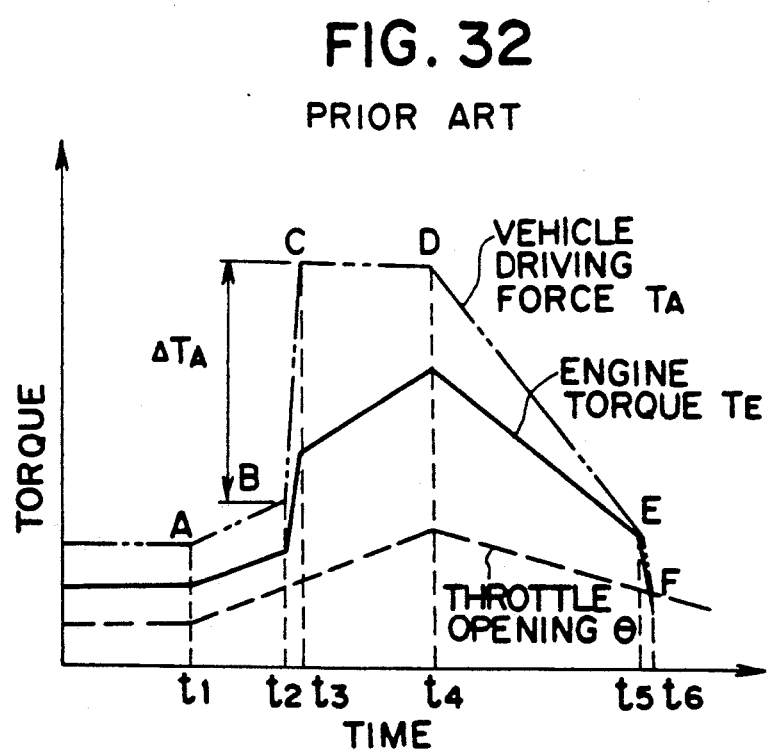
FIG. 32 is a diagram plotting the changes in the throttle opening, the engine torque and the vehicle driving force in time series.

The aforementioned changes in the throttle opening, the engine torque and the vehicle driving force are plotted in time series in FIG. 19, as in FIG. 32. The difference $\Delta T_A$ between the vehicle driving force in the running mode (at time $t_2$), as indicated by point B in FIG. 17, and the vehicle driving force in the running mode (at time $t_a$), as indicated by point C in FIG. 17 is smaller than that of the control system of the prior art, as shown in FIG. 32. Thus, it is apparent that there increases no excessive increase of driving force which is not expected by the driver will occur.

Here, reference is returned to the flow chart of FIG. 12. If the answers at individual Steps 102, 103 and 104 are "YES", the control routine advances to Step 116, at which the torque transmission capacity $C_V$ is determined to "0". For this, the current value I is set (at Step 117) to "0", having the reasons as follows.

If the torque transmission capacity $C_V$ of the viscous coupling 33 is at "0" on idling, the converter capacity of the entire transmission mechanism drops so that the mileage can be improved by reducing the fuel injection quantity on idling.

By setting the torque transmission capacity $C_V$ of the viscous coupling 33 to "0" on braking, moreover, the converter capacity of the entire transmission mechanism can be reduced to prevent the engine stall.

If, still moreover, the torque transmission capacity $C_V$ of the viscous coupling 33 in the neutral state is set to "0", the shifting shocks at the time of a manual shift to the driving range or reverse range can be prevented together with those on shifting.

In the control system thus far described, if the output characteristics of the engine are the lower ones, the torque transmission capacity of the viscous coupling 33 is decreased to reduce the converter capacity of the entire transmission mechanism. Thus, the speed ratio is lowered whereas the torque ratio is heightened so that a high driving force can be achieved even in the partial cylinder running mode.

If, on the contrary, the engine torque is raised, the converter capacity of the entire transmission mechanism is enlarged with the increase in the torque transmission capacity of the viscous coupling 33 to heighten the speed ratio so that the efficiency and accordingly the mileage can be improved.

As has been apparent from the foregoing embodiment, according to the present invention, the disadvantage accompanying the discontinuous change in the output torque characteristics of the engine is eliminated by controlling the torque transmission capacity of the viscous coupling. Therefore, the present invention can be applied to an automatic transmission which is connected to an engine having its output torque characteristics varied to at least two output torque characteristics of higher and lower ones as in the variable cylinder engine exemplified in the foregoing embodiment. The engine of this kind can be exemplified by an engine equipped with a supercharger or a lean combustion engine. If the present invention is applied to the automatic transmission connected to such engine, the control system may increase the torque transmission capacity of the viscous coupling when the supercharger is to be operated or when the stoichiometric combustion is to be accomplished.

Here will be described an example of controlling the torque transmission capacity $C_V$ of the torque converter of the automatic transmission which is connected to the engine equipped with the supercharger.

Figure 20:
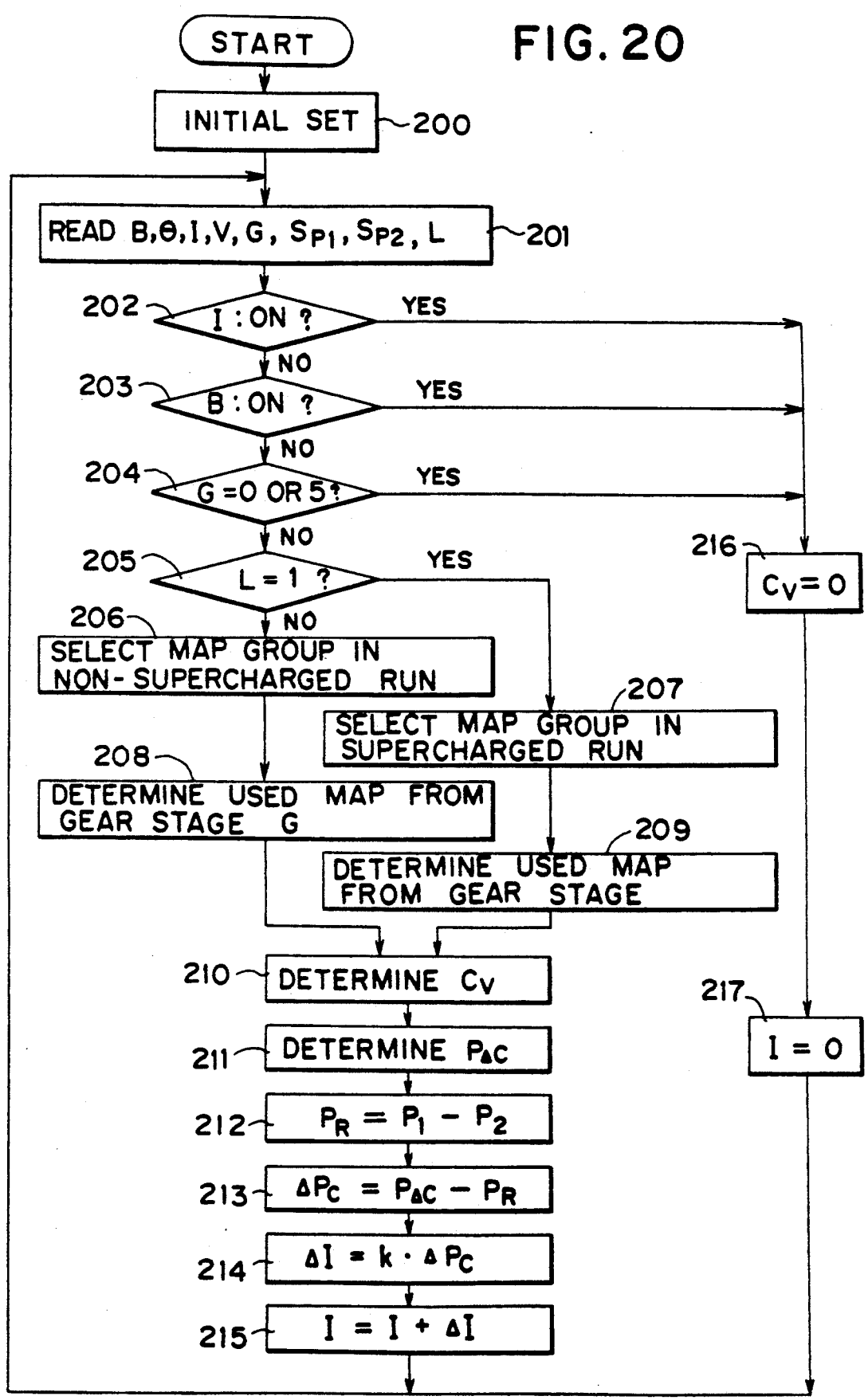
FIG. 20 is a flow chart showing a control routine for controlling the torque transmission capacity on the basis of the output characteristics of an engine equipped with a supercharger.

FIG. 20 is a flow chart showing one example of the control routine of the torque transmission capacity $C_V$ in the aforementioned viscous coupling 33 and directed to an automatic transmission which is connected to an engine equipped with a supercharger. Moreover, the controls to be described in the following are used for the torque transmission capacity in the viscous coupling 33 which is arranged in series with the lock-up clutch 38, and it presumes that the lock-up clutch 38 is engaged.

After an initial setting has been executed at Step 200, the individual detected signals are read in at Step 201. The signals are the brake signal B, the throttle opening $\theta$, the idle signal i, the vehicle speed signal V, the gear stage signal G, the oil pressure signals $S_{P1}$ and $S_{P2}$, a supercharge running signal L and other signals.

At subsequent Step 202, it is decided whether or not the idle signal i is "ON". If "NO", the control routine advances to Step 203, at which it is decided whether or not the brake signal B is "ON". If "NO", the routine further advances to Step 204, at which it is decided whether the gear stage signal G is at "0" or "5". The neutral state is indicated if the gear stage signal G is at "0", and the shifting operation is indicated if the gear stage signal G is at "5". If neither of the two values, the routine advances to Step 205, which it is decided whether or not the supercharge running signal L is at "1".

The running mode (i.e., the supercharged run) in which the output characteristics are heightened by operating the supercharger is indicated if the supercharge running signal L is at "1", and the running mode (i.e., the non-supercharged run) in which the output characteristics are lowered by stopping the supercharger is indicated if at "0". If, therefore, the answer of Step 205 is "NO", the control routine advances to Step 206, at which the map group for the non-supercharged running mode is selected. If, on the contrary, the answer is "YES", the routine advances to Step 207, at which the map group for the supercharged running mode is selected.

Figure 21:
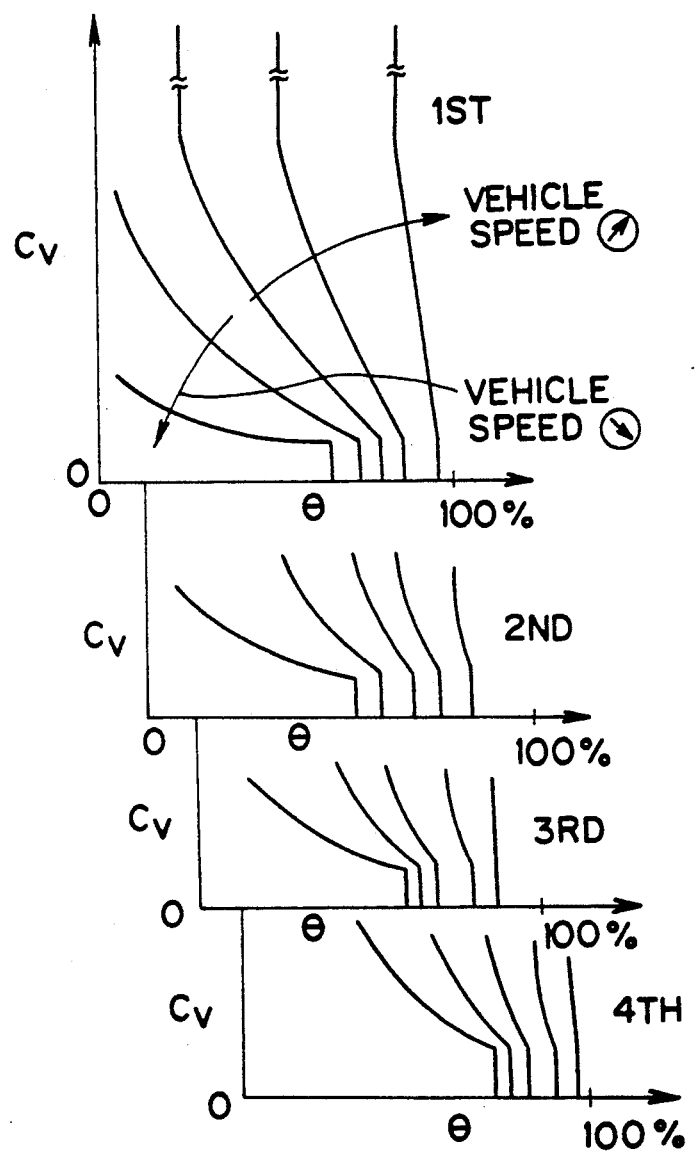
FIG. 21 is a diagram showing a map group for a non-supercharged running mode for determining the torque transmission capacity.
Figure 22:
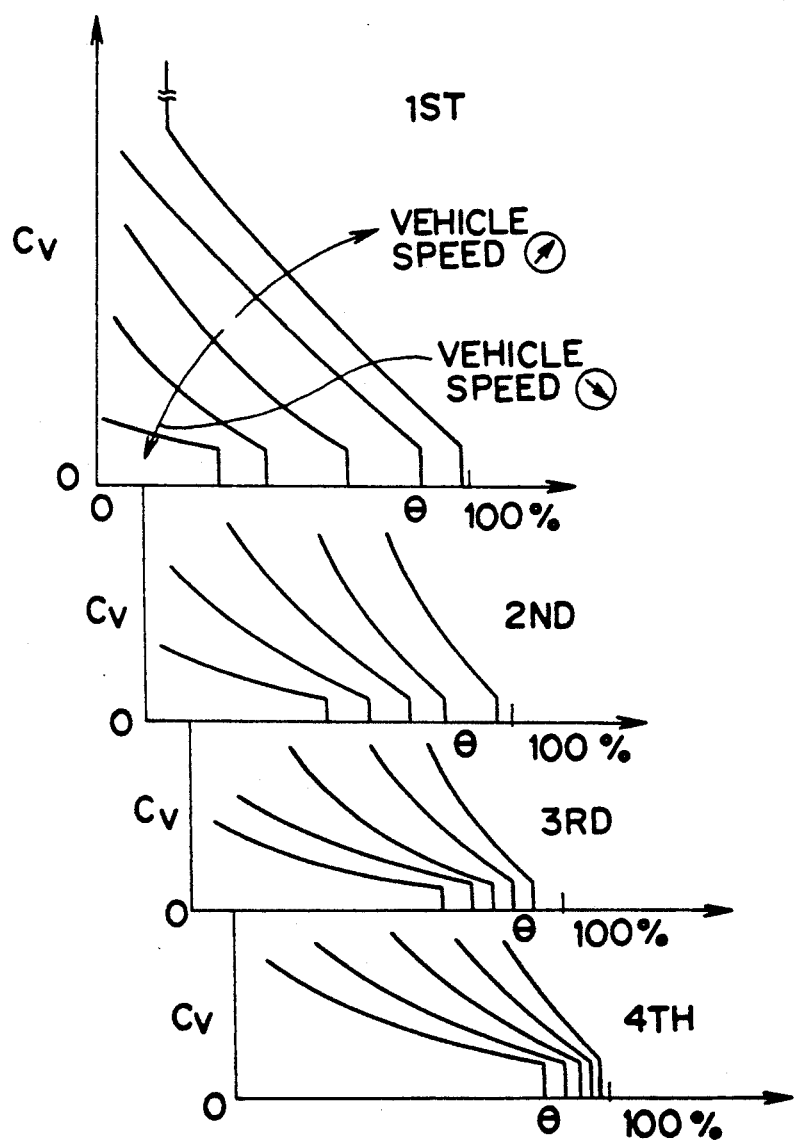
FIG. 22 is a diagram showing a map group for a supercharged running mode for determining the torque transmission capacity.

These map groups are exemplified in FIGS. 21 and 22, of which FIG. 21 presents the map group for the non-supercharged running mode whereas FIG. 22 presents the map group for the supercharged running mode. The maps determine the relation between the throttle opening $\theta$ and the torque transmission capacity $C_V$ in the viscous coupling 33 by using the vehicle speed as a parameter and are prepared for the individual gear stages of 1st to 4th speeds.

The difference between the maps for the non-supercharged and supercharged running modes is that the value of the torque transmission capacity $C_V$ for a predetermined throttle opening is generally set to a smaller value in the map for the supercharged running mode. This difference is exemplified in FIG. 23 plotting the characteristic curves for the non-supercharged running mode (by solid lines) and the characteristic curves for the supercharged running mode (by dash lines) at a certain gear stage and at a certain vehicle speed.

Figure 23:
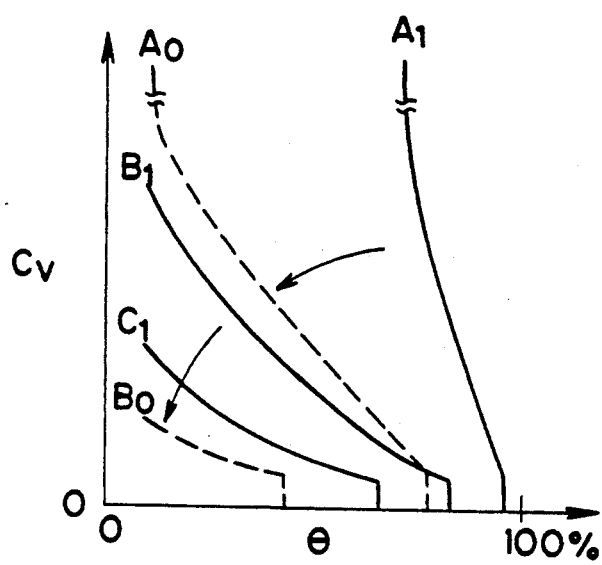
FIG. 23 is a $\theta$-$C_v$ diagram for explaining the difference between the maps for the non-supercharged running mode and the supercharged running mode.

Specifically in FIG. 23, a characteristic curve $A_0$ corresponds to a characteristic curve $A_1$, and a characteristic curve $B_0$ corresponds to a characteristic curve $B_1$. No characteristic curve for the supercharged running mode is provided but $C_V=0$ for a characteristic curve $C_1$.

As could be seen from FIG. 23, therefore, the torque transmission capacity $C_V$ of the viscous coupling 33 in the supercharged running mode in which the engine has higher output characteristics is set to a smaller value than that in the non-supercharged running mode. In other words, in the supercharged running mode having higher output characteristics, the torque amplification of the viscous coupling 33 is utilized by decreasing the torque transmission capacity in the viscous coupling 33 and increasing the torque transmission in the torque converter.

Since the maps are prepared for the individual gear stages, as described above, the map to be used is determined (at Step 208 or 209) for each running mode on the basis of the gear stage.

Figure 24:
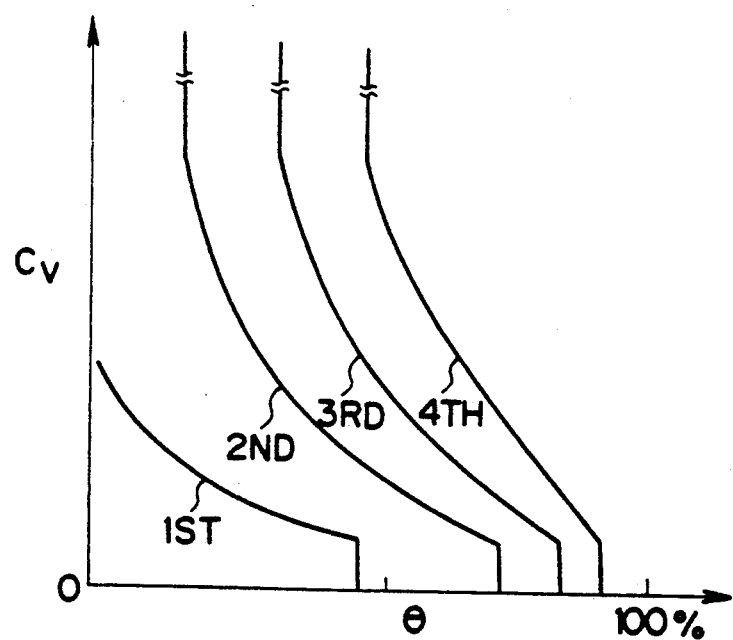
FIG. 24 is a θ-$C_v$ diagram for explaining the difference between the characteristic curves at the individual gear stages.

Here will be described the difference of the characteristic curves for each gear stage. FIG. 24 plots the relations between the throttle opening and the torque transmission capacity $C_V$ by using the gear stages as a parameter. As could be seen from FIG. 24, the torque transmission capacity $C_V$ is made the lower for the lower gear stage in each map. This is because the torque amplification of the viscous coupling 33 is sufficiently utilized by decreasing the torque transmission in the viscous coupling 33 and increasing the torque transmission in the torque converter, since the higher power performance is required for the lower gear stage.

After a map has been selected for each running mode, as described above, the torque transmission capacity $C_V$ according to the throttle opening and the vehicle speed at that time is determined at Step 210 from the selected map.

At subsequent Step 211, a target pressure difference $P\Delta_C$ is determined. Specifically, this target value $P\Delta_C$ is determined on the basis of the map of FIG. 8 like the foregoing example of control.

At Step 212, on the other hand, the difference (i.e., the actually measured difference) $P_R$ ($=P_1-P_2$) between the measured values of the pressures $P_1$ and $P_2$ across the lock-up clutch 38 is computed.

At Step 213, moreover, the difference $\Delta P_C$ ($=P\Delta_C-P_R$) between the target value $P\Delta_C$ determined at Step 211 and the measured pressure difference $P_R$ determined at Step 212 is computed.

Next, at Step 214, the corrected current value $\Delta I$ is computed. Since this corrected current value $\Delta I$ is in proportion to the difference $\Delta P_C$, as shown in FIG. 9, it is determined at Step 214 on the basis of the proportional relation. At subsequent Step 215, the current value being added the corrected current value $\Delta I$ is replaced by the control current I and outputted to the aforementioned signal pressure generator 49.

Then, the control routine is returned to upstream of the Step 201.

In the aforementioned controls flowing from Step 201 to Step 215, therefore, the running mode is changed from the non-supercharged to supercharged ones as the throttle opening increases. If the output characteristics of the engine are changed to the higher ones, the torque transmission capacity $C_V$ of the viscous coupling 33 arranged in parallel relationship with the torque converter 20 is decreased. As a result, the torque transmission by the torque converter 20 increases, and the turbine torque, i.e., the output shaft torque is raised by the torque amplification.

Figure 25:
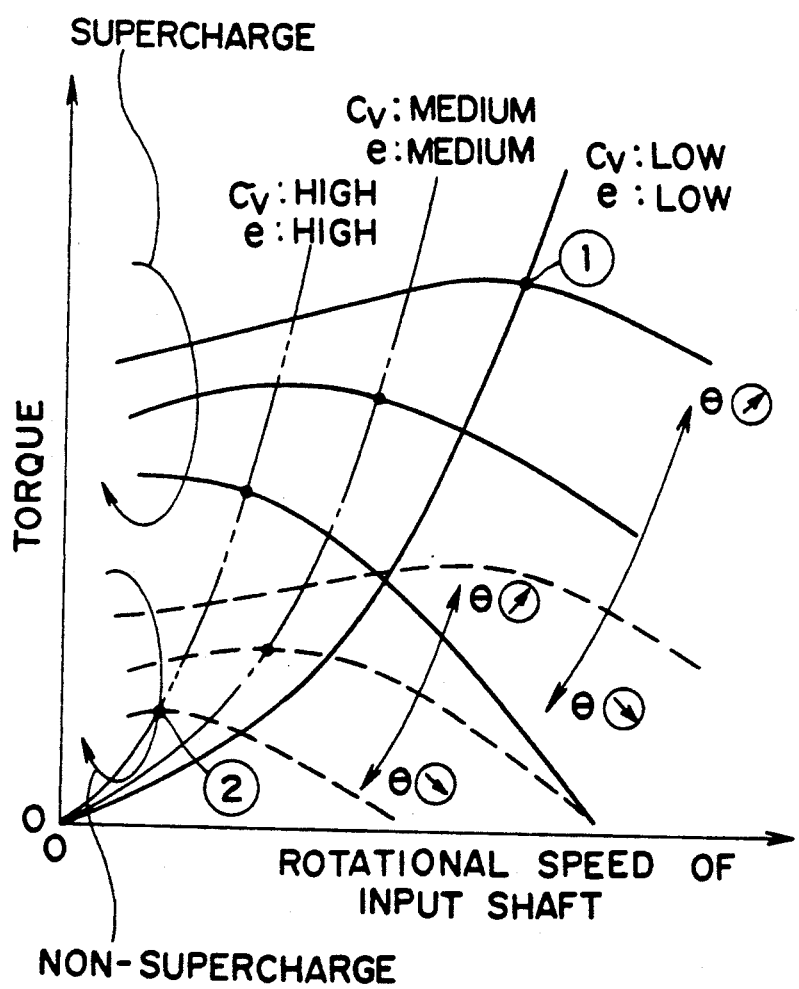
FIG. 25 is a diagram plotting the output torque characteristics of the engine and the characteristics of the transmission mechanism.
Figure 26:
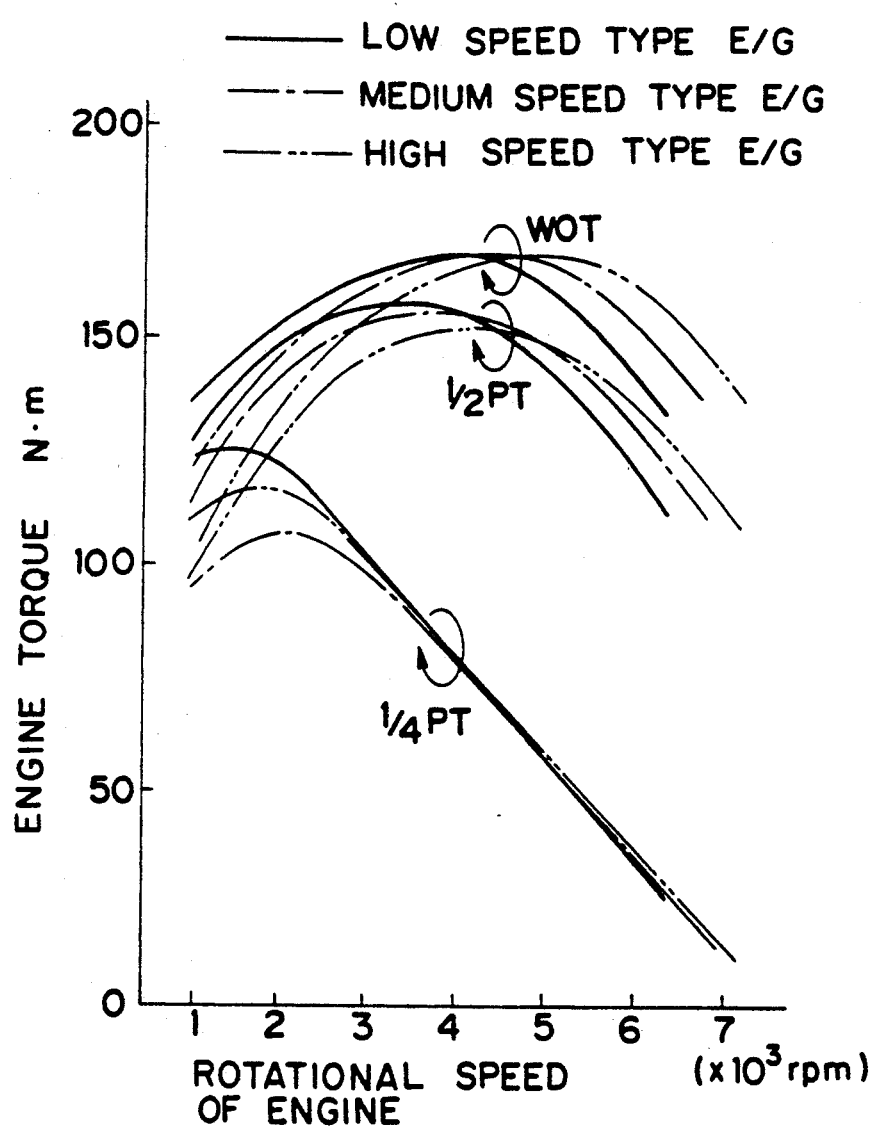
FIG. 26 is a diagram plotting the model performance of the engine.
Figure 27:
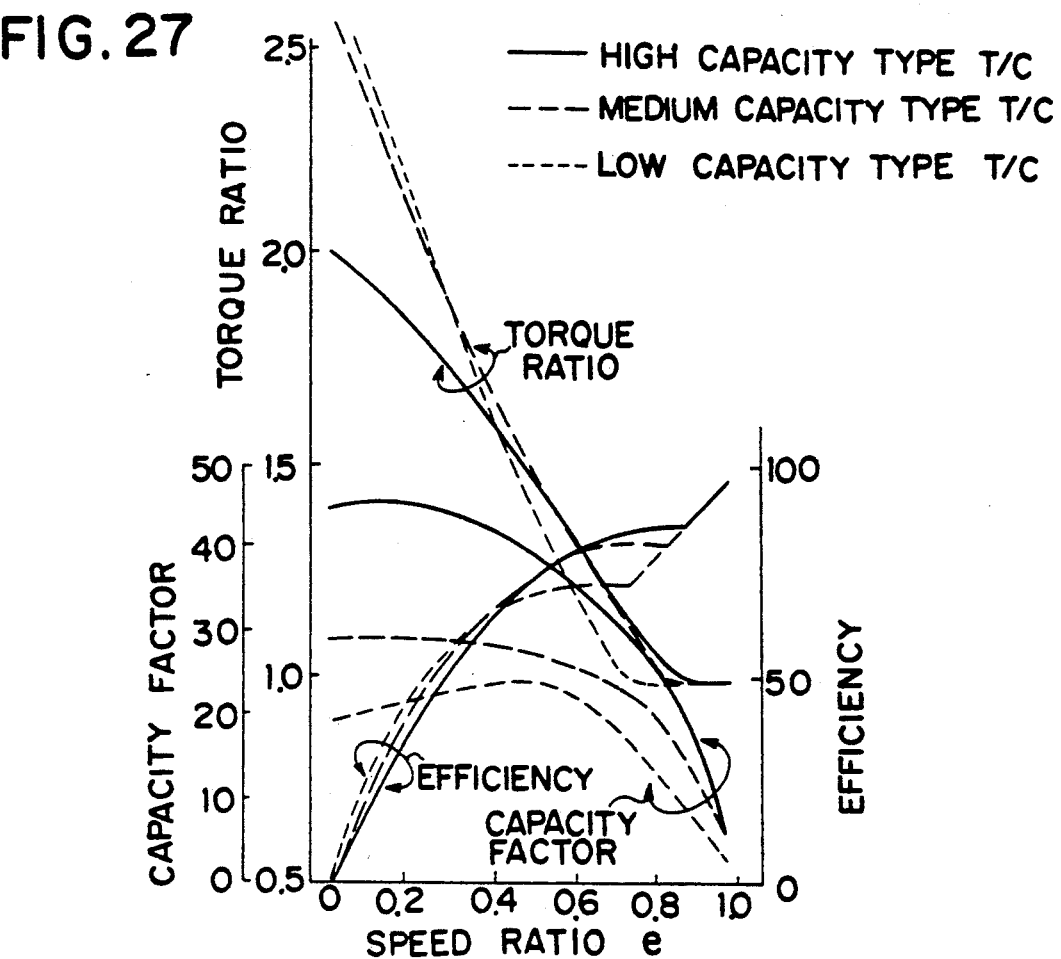
FIG. 27 is a diagram plotting the model characteristics of the torque converter.
Figure 28:
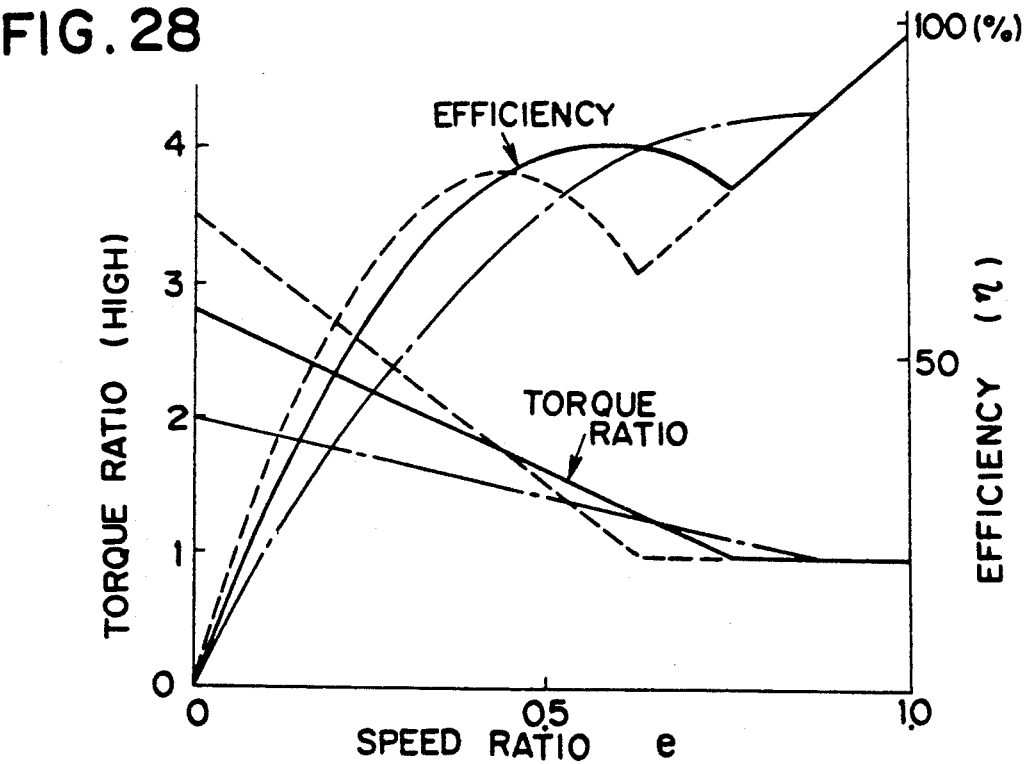
FIG. 28 is a diagram plotting the general characteristics of torque converters having a different torque transmission capacity.
Figure 29:
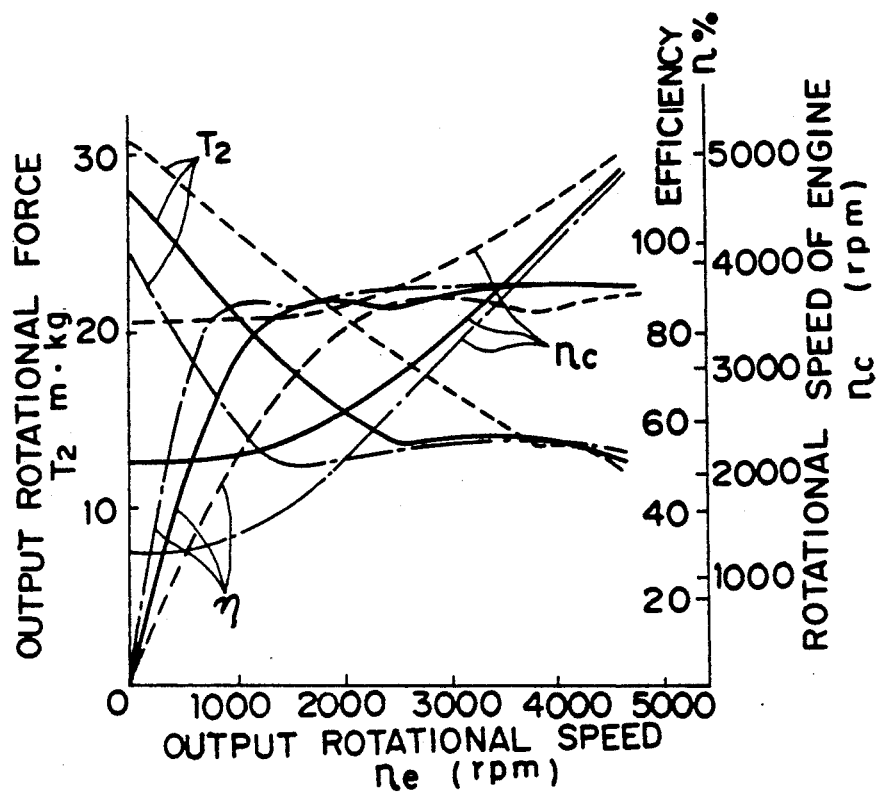
FIG. 29 is a diagram plotting the input characteristic curves of torque converters having a different torque transmission capacity.
Figure 30:
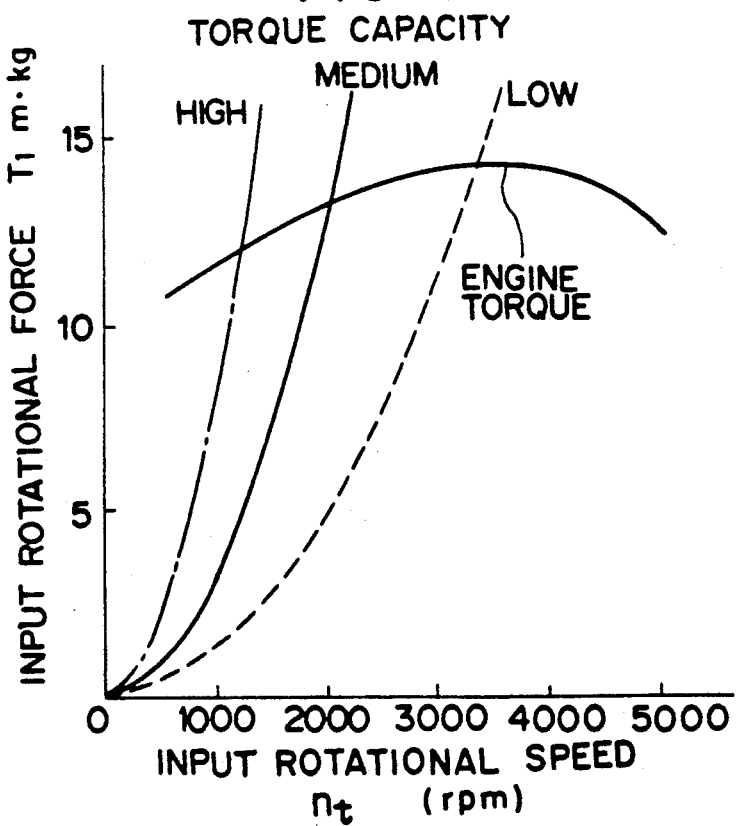
FIG. 30 is a diagram plotting the output characteristic curves of torque converters having a different torque transmission capacity.
Figure 31:
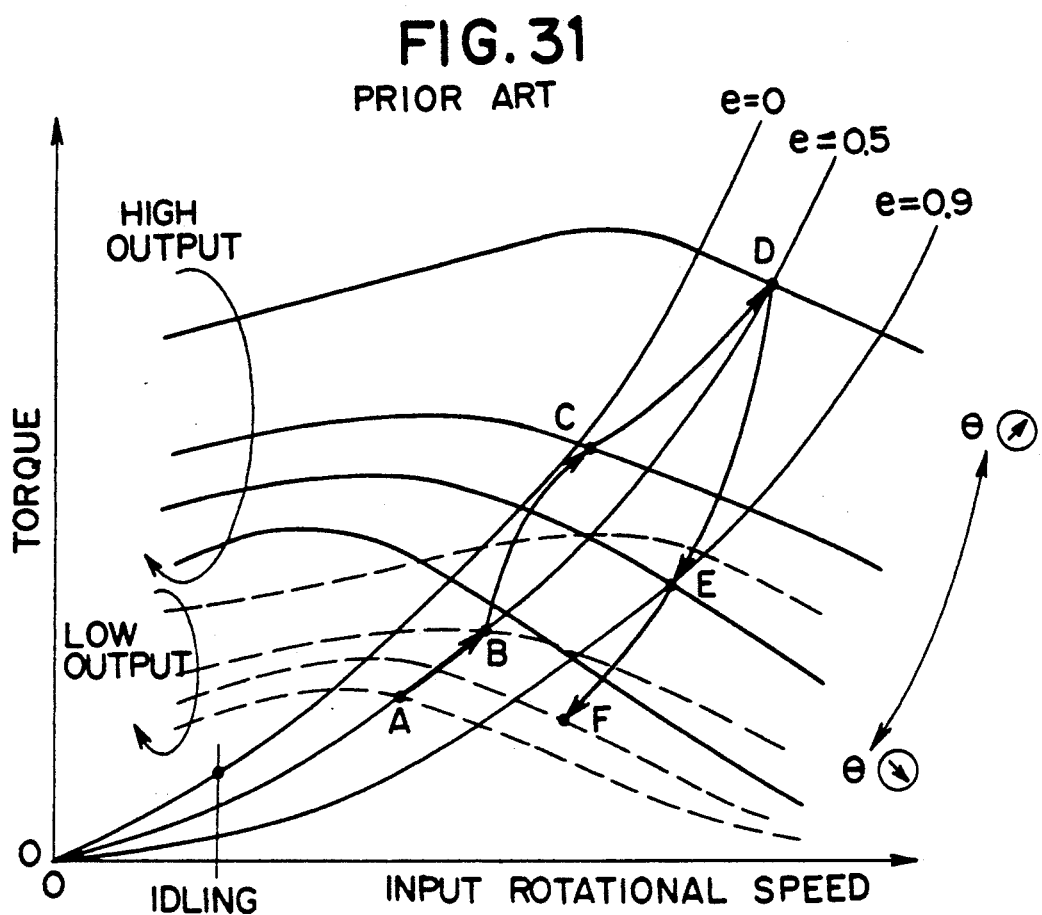
FIG. 31 is a diagram for explaining the changes in the running mode of the system of the prior art, namely, a characteristic curve diagram plotting the relations between input rotational speed and torque.

This will be described in the following with reference to FIG. 25.

In the aforementioned controls, more specifically, the torque transmission capacity of the viscous coupling 33 decreases to reduce the speed ratio e at the torque converter 20 and heighten the torque ratio, if the output characteristics of the engine are the higher ones. As a result, the characteristics of the torque converter match the peak of the engine torque, as indicated by ① in FIG. 25, and it is possible to obtain an excellent power performance. If, on the other hand, the engine output characteristics are the lower ones, the torque transmission capacity of the viscous coupling 33 is increased to enlarge the speed ratio e of the torque converter 20 so that the characteristics of the torque converter match the peak of the engine torque, as indicated by ② in FIG. 25. In short, the torque transmission can be accomplished efficiently with little slip to improve the mileage. Since, in this case, much torque is transmitted by the viscous coupling 33 having no torque amplification, the vibration to be caused by the torque fluctuations of the engine are hardly transmitted to downstream of the transmission mechanism to invite an advantage in reducing the vibrations and the booming noise.

If, in the flow chart of FIG. 20, the answers of Steps 202, 203 and 204 are "YES", the control routine advances to Step 216, at which the torque transmission capacity $C_V$ is determined to "0". For this determination, moreover, the current value I is set (at Step 217) to "0". The reason for providing such control routine is similar to that for the foregoing control routine.

Here will be synthetically described the advantages to be attained by the present invention. In the present invention, since the torque transmission capacity of the variable capacity type viscous coupling connected in parallel relationship with the coupling for transmitting a torque through a fluid is controlled in accordance with the output condition of the engine, the lock-up range can be extended to improve the mileage and the running performance. Moreover, it is possible to prevent the abrupt increases in the engine rotations and in the driving torque and to improve the riding comfort of the vehicle.

What is claimed is:

1. In an automobile transmission connected to an engine and comprising: a fluid coupling for transmitting a torque between an input member and an output member; a lock-up clutch selectively engageable with said input member; and a variable capacity type viscous coupling arranged in series between said lockup clutch and said output member,
a control system comprising:
lock-up detecting means for detecting that said lock-up clutch is engaged;
output state detecting means for detecting an output state of said engine;
torque transmission capacity determining means for determining a torque transmission capacity of said variable capacity type viscous coupling in accordance with the output state of said engine which is detected by said output state detecting means, if said lock-up detecting means detects that said lock-up clutch is engaged; and
a mechanism for setting the torque transmission capacity of said variable capacity type viscous coupling to said determined torque transmission capacity.

2. A control system in an automatic transmission according to claim 1, wherein
said output state detecting means includes means for detecting a throttle opening of said engine, and
said torque transmission capacity determining means for setting the torque transmission capacity to a smaller value as said throttle opening increases, and to a larger value as said throttle opening decreases.

3. A control system in an automatic transmission according to claim 1, wherein
said engine includes output characteristic changing means for changing its output characteristics to at least two characteristics of higher and lower outputs, and
said output state detecting means includes output characteristic detecting means for detecting the output characteristics of said engine, which have already been changed by said output characteristic changing means.

4. A control system in an automatic transmission according to claim 3, wherein
said torque transmission capacity determining means includes means for setting said torque transmission capacity such that, when said output state detecting means detects that the output characteristics of said engine are the higher outputs, the torque transmission capacity is set to values smaller than those to which it is set when said output state detecting means detects that said output characteristics are the lower outputs.

5. A control system in an automatic transmission according to claim 3, wherein
said torque transmission capacity determining means includes means for setting said torque transmission capacity such that, when said output characteristics detecting means detects that the output characteristics of said engine are the higher outputs, the torque transmission capacity is set to values smaller than those to which it is set when said output characteristics detecting means detects that said output characteristics are the lower outputs.

6. A control system in an automatic transmission according to claim 3, wherein
said engine includes cylinder number changing means for changing the number of cylinders to cause combustion,
said output characteristic detecting means includes means for detecting that a running mode of said engine is a partial cylinder running mode having a reduced number of operating cylinders, and
said torque transmission capacity determining means includes means for setting the torque transmission capacity such that, when the partial cylinder running mode is detected, the torque transmission capacity is set to a value larger than the value to which it is set when the partial cylinder running mode is not detected.

7. A control system in an automatic transmission according to claim 3, wherein
said engine includes air/fuel ratio changing means for changing a normal operation in which an air/fuel ratio is a substantially stoichiometric ratio to a lean combustion operation in which the air/fuel ratio is higher than the stoichiometric ratio, said output characteristic detecting means includes means for detecting whether said engine is in the normal operation or the lean operation, and said torque transmission capacity determining means includes means for setting the torque transmission capacity such that, when the normal operation is detected, the torque transmission capacity is set to a value larger than that to which the torque transmission capacity is set when the lean combustion operation is detected.

8. A control system in an automatic transmission according to claim 3, wherein said engine includes a super charger, said output characteristic detecting means includes means for detecting that said supercharger is in operation, and said torque transmission capacity determining means includes means for setting the torque transmission capacity such that, when it is detected that said supercharger is in operation, the torque transmission capacity is set to a value larger than the value to which the torque transmission capacity is set when it is not detected that said super charger is in operation.

9. A control system in an automatic transmission according to claim 3, wherein said engine cylinder number changing means for changing the number of cylinders which cause combustion, said output characteristic detecting means includes means for detecting that a running mode of said engine is a partial cylinder running mode having a reduced number of operating cylinders, and said torque transmission capacity determining means includes means for setting the torque transmission capacity such that, when the partial cylinder running mode is detected, the torque transmission capacity is set to a value smaller than the value to which the torque transmission capacity is set when the partial cylinder running mode is not detected.

10. A control system in an automatic transmission according to claim 3, wherein said engine includes air/fuel ratio changing means for changing a normal operation in which an air/fuel ratio is a substantially stoichiometric ratio, and a lean combustion operation in which the air/fuel ratio is higher than the stoichiometric ratio, said output characteristic detecting means includes means for detecting whether said engine is in the normal operation or the lean combustion operation, and said torque transmission capacity determining means includes means for determining that the torque transmission capacity of the case in which the normal operation is detected is set to a smaller value than that of the case in which the lean combustion operation is detected.

11. A control system in an automatic transmission according to claim 1, wherein said engine includes a supercharger, said output characteristic detecting means includes means for detecting that said supercharger is in operation, and said torque transmission capacity determining means includes means for setting the torque transmission capacity such that, when it is determined that said supercharger is in operation, the torque transmission capacity is set to a value smaller than the value to which the torque transmission capacity is set when it is not detected that said supercharger is in operation.

12. A control system in an automatic transmission according to claim 1, further comprising means for detecting an idling state, wherein said torque transmission capacity determining means includes means for setting the torque transmission capacity such that, when the idling state is detected, the torque transmission capacity is set substantially to zero.

13. A control system in an automatic transmission according to claim 1, further comprising means for detecting a braking state, wherein said torque transmission capacity determining means includes means for setting the torque transmission capacity such that, when the braking state is detected, the torque transmission capacity is set substantially to zero.

14. A control system in an automatic transmission according to claim 1, further comprising means for detecting that a shift is being executed.

wherein said torque transmission capacity determining means includes means for determining that the torque transmission capacity is set substantially to zero during the shift.

15. A control system in an automatic transmission according to claim 1, further comprising means for detecting a gear stage which is set in said automatic transmission, said torque transmission capacity determining means includes means for setting the torque transmission capacity such that, when a lower gear stage is detected, the torque transmission capacity is set to a value smaller than the value to which the torque transmission capacity is set when a higher gear stage is detected.

16. A control system in an automatic transmission according to claim 1, further comprising means for detecting that said automatic transmission is in a neutral state, wherein said torque transmission capacity determining means includes means for determining that the torque transmission capacity is set substantially to zero if the neutral state is detected.

17. In an automobile transmission connected to an engine and comprising: a fluid coupling for transmitting a torque between an input member and an output member; a lockup clutch selectively engageable with said input member; and a variable capacity type viscous coupling arranged in series between said lockup clutch and said output member, a control method comprising:

a first step of detecting that said lock-up clutch is engaged;

a second step of detecting an output state of said engine; and a third step of determining the torque transmission capacity of said variable capacity type viscous coupling in accordance with the detected output state of said engine if it is detected that said lock-up clutch is engaged.

18. A control method in an automatic transmission according to claim 17, wherein a throttle opening of said engine is detected at said second step, and the torque transmission capacity is set to a smaller value as the throttle opening increases, and to a larger value as the throttle opening decreases at said third step.

19. A control method in an automatic transmission according to claim 17, further comprising an output characteristics changing means for setting the output characteristics of the engine to one of at least two output characteristics of higher and lower values, and
wherein the output characteristics of said engine which have already been changed by said output characteristic changing means are detected at said second step.

20. A control method in an automatic transmission according to claim 19,
wherein when it is detected at said second step that said engine has the higher output characteristics, the torque transmission capacity is set at said third step to a value smaller than that to which the torque transmission capacity is set when it is detected that said engine has the lower output characteristics.

21. A control method in an automatic transmission according to claim 19,
wherein when it is detected at said second step that said engine has the higher output characteristics, the torque transmission capacity is set at said third step to a value larger than that to which the torque transmission capacity is set when it is detected that said engine has the lower output characteristics.

22. A control method in an automatic transmission according to claim 19, wherein
said engine includes cylinder number changing means for changing the number of cylinders operating to cause combustion,
whether a running mode of said engine is a partial cylinder running mode having a reduced number of operating cylinders is detected at said second step, and
wherein, when the partial cylinder running mode is detected, the torque transmission capacity is set at said third step to a value larger than that to which the torque transmission capacity is set when the partial cylinder running mode is not detected.

23. A control method in an automatic transmission according to claim 19, wherein
said engine includes a supercharger,
whether said supercharger is in operation is detected at said second step, and
wherein, when it is detected that said supercharger is in operation, the torque transmission capacity is set at said third step to a value smaller than that to which the torque transmission capacity is set when it is not detected that the supercharger is in operation.

* * * * *